United States Patent
Nomura et al.

(10) Patent No.: US 10,800,060 B2
(45) Date of Patent: Oct. 13, 2020

(54) SLITTING APPARATUS AND METHOD FOR PRODUCING SEPARATOR ROLL

(71) Applicant: SUMITOMO CHEMICAL COMPANY, LIMITED, Chuo-ku, Tokyo (JP)

(72) Inventors: Kiyomu Nomura, Niihama (JP); Tatsuya Kataoka, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 18 days.

(21) Appl. No.: 16/121,963

(22) Filed: Sep. 5, 2018

(65) Prior Publication Data

US 2019/0016002 A1 Jan. 17, 2019

Related U.S. Application Data

(62) Division of application No. 14/780,608, filed as application No. PCT/JP2015/065011 on May 26, 2015, now Pat. No. 10,105,861.

(30) Foreign Application Priority Data

Dec. 25, 2014 (JP) ................................ 2014-263595

(51) Int. Cl.
*B26D 1/02* (2006.01)
*B65H 18/02* (2006.01)
(Continued)

(52) U.S. Cl.
CPC ............... *B26D 1/025* (2013.01); *B26D 1/02* (2013.01); *B26D 1/035* (2013.01); *B26D 3/00* (2013.01);
(Continued)

(58) Field of Classification Search
CPC ...... B26D 1/025; B26D 1/035; B65H 18/021; B65H 18/26; H01M 2/145; H01M 2/1653; H01M 2/1686
See application file for complete search history.

(56) References Cited

U.S. PATENT DOCUMENTS 4,778,119 A * 10/1988 Yamazaki .............. B65H 18/10
226/190
5,522,785 A 6/1996 Kedl et al.
(Continued)

FOREIGN PATENT DOCUMENTS

CN 1384800 A 12/2002
JP 3-227859 A 10/1991
(Continued)

OTHER PUBLICATIONS

Communication dated Dec. 25, 2018, issued by the Japanese Patent Office in corresponding Japanese Application No. 2016-024065.
(Continued)

*Primary Examiner* — Sang K Kim
(74) *Attorney, Agent, or Firm* — Sughrue Mion, PLLC

(57) ABSTRACT

A wrinkle caused in a separator roll is inhibited. A slitting apparatus (6) changes a conveying direction of a first separator (12a) by a direction changing roller (68) toward a first take-up roller (70U), and conveys the first separator via an assisting roller (69) which is provided between a take-up position of the first separator to be wound and the direction changing roller so as to shorten a conveying distance between the take-up position and a roller immediately before the take-up position.

14 Claims, 16 Drawing Sheets

(51) Int. Cl.
*H01M 2/16* (2006.01)
*B65H 35/02* (2006.01)
*B26D 1/03* (2006.01)
*B26D 3/00* (2006.01)
*B26D 7/26* (2006.01)
*B65H 18/26* (2006.01)
*B65H 20/02* (2006.01)
*H01M 2/14* (2006.01)
*H01M 10/0525* (2010.01)

(52) U.S. Cl.
CPC ......... *B26D 7/2614* (2013.01); *B65H 18/021* (2013.01); *B65H 18/26* (2013.01); *B65H 20/02* (2013.01); *B65H 35/02* (2013.01); *H01M 2/145* (2013.01); *H01M 2/1653* (2013.01); *H01M 2/1686* (2013.01); *H01M 10/0525* (2013.01); *B65H 2301/4148* (2013.01); *B65H 2301/41282* (2013.01); *B65H 2801/72* (2013.01)

(56) References Cited

U.S. PATENT DOCUMENTS

| | | | |
|---|---|---|---|
| 5,842,663 | A | 12/1998 | O'Connor et al. |
| 6,425,547 | B1 | 7/2002 | Singh |
| 2002/0132162 | A1 | 9/2002 | Takata et al. |
| 2005/0116081 | A1 | 6/2005 | Kato et al. |
| 2010/0243788 | A1 | 9/2010 | Oku |
| 2014/0231572 | A1 | 8/2014 | Izawa et al. |

FOREIGN PATENT DOCUMENTS

| | | |
|---|---|---|
| JP | 9-77314 A | 3/1997 |
| JP | 11-71047 A | 3/1999 |
| JP | 11-246087 A | 9/1999 |
| JP | 11-246088 A | 9/1999 |
| JP | 2000-318890 A | 11/2000 |
| JP | 2002-273684 A | 9/2002 |
| JP | 2004-359355 A | 12/2004 |
| JP | 2005-162472 A | 6/2005 |
| JP | 2012-166869 A | 9/2012 |
| JP | 2012-166896 A | 9/2012 |
| JP | 2013-254595 A | 12/2013 |

OTHER PUBLICATIONS

International Preliminary Report on Patentability with translation of Written Opinion dated Jul. 6, 2017, issued by the International Searching Authority in application No. PCT/JP2015/065011.
International Search Report for PCT/JP2015/065011 dated Aug. 25, 2015.
Youtube video (C800 Slitter Rewinder—Extended Width Cantievered) (screenshots), Deacro Industries Ltd; Jun. 13, 2013 (2 pages total).
Communication dated Jun. 30, 2017, issued by the Korean Intellectual Property Office in corresponding Korean Application No. 10-2015-7026451.
English Translation of International Search Report dated Aug. 25, 2015, issued by the International Searching Authority in application No. PCT/JP2015/065011.
Japanese Office Action for JP 2015-527723 dated Aug. 18, 2015.
Office Action dated Mar. 2, 2018 in U.S. Appl. No. 14/780,608, filed Sep. 28, 2015 to NOMURA.
Communication dated Mar. 19, 2019, from the Japanese Patent Office in counterpart application No. 2016-024065.
Communication dated Jun. 23, 2020 from Japanese Patent Office in JP Application No. 2019-107278.

* cited by examiner

SLITTING APPARATUS AND METHOD FOR PRODUCING SEPARATOR ROLL

CROSS-REFERENCE TO RELATED APPLICATIONS

This application is a divisional of U.S. patent application Ser. No. 14/780,608, filed Sep. 28, 2015 (now allowed), which is a 371 of PCT/JP2015/065011, filed May 26, 2015, which claims benefit to Japanese Patent Application No. 2014-263595, filed Dec. 25, 2014. The entire disclosures of the prior applications are considered part of the disclosure of the accompanying divisional application, and are hereby incorporated by reference.

TECHNICAL FIELD

The present invention relates to a slitting apparatus for slitting a separator that is used in a battery such as a lithium-ion battery.

BACKGROUND ART

As the slitting apparatus, for example, a slitting apparatus disclosed in Patent Literature 1 is known. The technique disclosed in Patent Literature 1 is aimed at providing a method for slitting a battery separator while hardly causing defects such as a pore and a rip in a slitting step. In view of this, the technique disclosed in Patent Literature 1 focuses on tension applied to the separator after being slit.

CITATION LIST

Patent Literature

[Patent Literature 1]
Japanese Patent Application Publication Tokukai No. 2002-273684 (Publication date: Sep. 25, 2002)

SUMMARY OF INVENTION

Technical Problem

A battery separator is supplied to a battery production process in a form of a roll obtained by winding the slit separator on a core. In the battery production process, the separator wound off from the roll is to be laminated with a positive electrode film and a negative electrode film which are similarly and separately wound off from respective rolls.

However, in a case where a separator is wound off from a roll in which the separator has been wound up with a wrinkle or misaligned winding, the separator thus wound off is more likely to meander. In such a case where the separator meanders, a defect is caused in lamination with the positive electrode film and the negative electrode film. Under the circumstances, the roll of the separator is highly demanded to involve less wrinkles and less misaligned winding.

Note that the positive electrode film and the negative electrode film are also demanded to involve less wrinkles and less misaligned winding but the demand is particularly high for the separator. This is because of reasons below: that is, in a process of producing the separator, a stretching process is carried out, and therefore a film thickness is more likely to be uneven, and accordingly the unevenness in film thickness may cause a wrinkle and misaligned winding. Moreover, the separator which is porous is soft, and therefore a wrinkle is more likely to occur.

As above described, the technique disclosed in Patent Literature 1 focuses on tension applied to the separator after the slitting in order to hardly causing defects such as a pore and a rip in a slitting step, and Patent Literature 1 does not disclose a measure to inhibit a wrinkle and misaligned winding.

The present invention is accomplished in view of the problems, and its object is to inhibit a wrinkle that is caused when a separator after being slit is wound.

Solution to Problem

A slitting apparatus in accordance with an aspect of the present invention includes: a slitting section for slitting an original sheet of a battery separator in a lengthwise direction so as to divide the original sheet into at least a first separator and a second separator; a first take-up section and a second take-up section for taking up the first separator and the second separator, respectively, the first take-up section and the second take-up section being arranged in a positional relation of above and below; at least one direction changing roller for changing conveying directions of the first separator and the second separator toward the first take-up section and the second take-up section, respectively; and a first take-up assisting roller provided between a take-up position of the first separator to be wound and the direction changing roller so as to shorten a conveying distance between the take-up position and a roller immediately before the take-up position, the first take-up assisting roller being a concave roller.

A method for producing a separator roll in accordance with an aspect of the present invention includes the steps of: (a) slitting an original sheet of a battery separator in a lengthwise direction so as to divide the original sheet into at least a first separator and a second separator; (b) changing conveying directions of the first separator and the second separator by at least one direction changing roller toward a first take-up section and a second take-up section, respectively; (c) taking up the first separator and the second separator by the first take-up section and the second take-up section, respectively, the first take-up section and the second take-up section being arranged in a positional relation of above and below; and (d) conveying the first separator via a first take-up assisting roller which is provided between a take-up position of the first separator to be wound and the direction changing roller so as to shorten a conveying distance between the take-up position and a roller immediately before the take-up position, the first take-up assisting roller being a concave roller.

A slitting apparatus in accordance with an aspect of the present invention includes: a slitting section for slitting an original sheet of a battery separator in a lengthwise direction so as to divide the original sheet into a plurality of separators; a take-up section for winding one of the plurality of separators on a core; a touch roller whose position is changed in accordance with a change in outer diameter of a separator roll so as to press the one of the plurality of separators onto a take-up surface of the separator roll which has been formed on the core; and a take-up assisting roller for conveying the one of the plurality of separators immediately before the touch roller, the take-up assisting roller being a concave roller.

A method for producing a separator roll in accordance with an aspect of the present invention includes the steps of: (A) slitting an original sheet of a battery separator in a lengthwise direction so as to divide the original sheet into a plurality of separators; (B) winding one of the plurality of separators on a core; (C) pressing, by a touch roller, the one of the plurality of separators onto a take-up surface of a separator roll which has been formed on the core, a position of the touch roller being changed in accordance with a change in outer diameter of the separator roll; and (D) conveying, by a take-up assisting roller, the one of the plurality of separators immediately before the touch roller, the take-up assisting roller being a concave roller.

Advantageous Effects of Invention

According to an aspect of the present invention, it is possible to inhibit a wrinkle caused in a separator.

DESCRIPTION OF EMBODIMENTS

[Basic Configuration]

The following discusses in order a lithium-ion secondary battery, a separator, a heat-resistant separator, a method for producing the heat-resistant separator, a slitting apparatus, and a cutting device.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
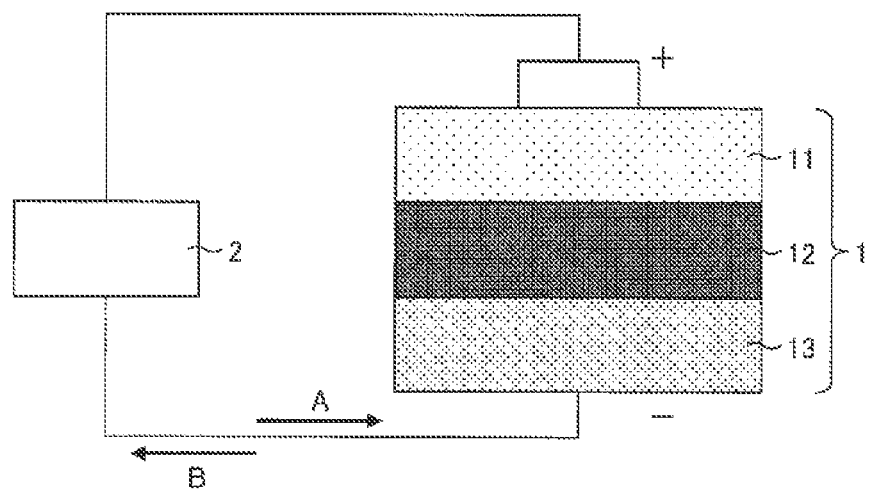
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film which separates the cathode 11 and the anode 13, allowing lithium ions to move between the cathode 11 and the anode 13. The separator 12 contains, for example, polyolefin such as polyethylene or polypropylene as a material.

Figure 2A:
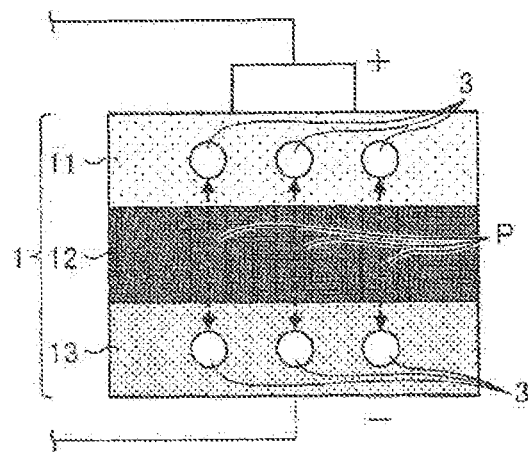
FIGS. 2A, 2B and 2C are schematic views illustrating details of a configuration of the lithium-ion secondary battery illustrated in FIG. 1.
Figure 2B:
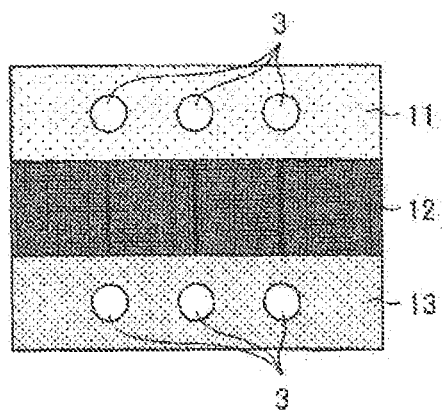
Figure 2C:
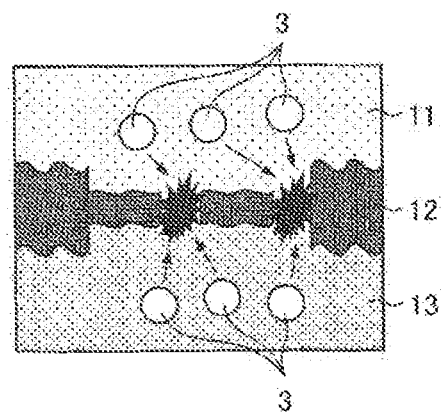

FIGS. 2A, 2B and 2C are schematic views illustrating details of the configuration of the lithium-ion secondary battery 1 illustrated in FIG. 1. FIG. 2A illustrates a normal configuration. FIG. 2B illustrates a state in which a temperature of the lithium-ion secondary battery 1 has risen.

FIG. 2C illustrates a state in which a temperature of the lithium-ion secondary battery 1 has sharply risen.

As illustrated in FIG. 2A, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in FIG. 2B. As a result, the separator 12 shrinks. This stops the movement of the lithium ions 3, and consequently stops the above temperature rise.

However, in a case where a temperature of the lithium-ion secondary battery 1 sharply rises, the separator 12 suddenly shrinks. In this case, as illustrated in FIG. 2C, the separator 12 may be destroyed. Then, the lithium ions 3 leak out from the separator 12 which has been destroyed. As a result, the lithium ions 3 do not stop moving. Consequently, the temperature continues rising.

(Heat-Resistant Separator)

Figure 3A:
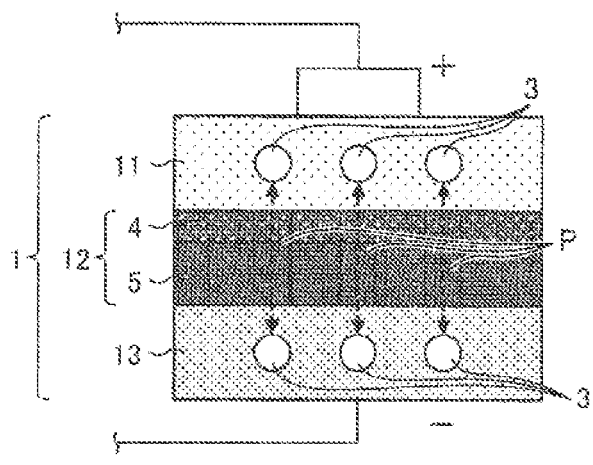
FIGS. 3A and 3B are schematic views illustrating another configuration of the lithium-ion secondary battery illustrated in FIG. 1.
Figure 3B:
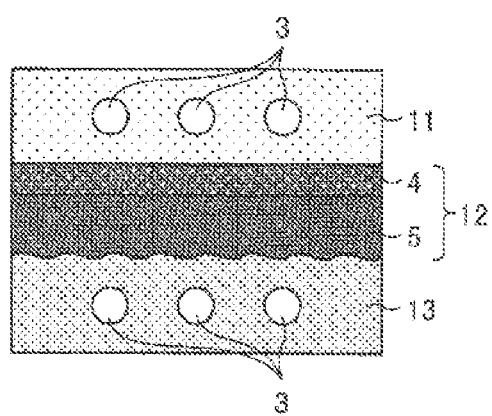

FIGS. 3A and 3B are schematic views illustrating another configuration of the lithium-ion secondary battery 1 illustrated in FIG. 1. FIG. 3A illustrates a normal configuration, and FIG. 3B illustrates a state in which a temperature of the lithium-ion secondary battery 1 has sharply risen.

As illustrated in FIG. 3A, the separator 12 can be a heat-resistant separator that includes a porous film 5 and a heat-resistant layer 4. The heat-resistant layer 4 is laminated on a surface of the porous film 5 which surface is on a cathode 11 side. Note that the heat-resistant layer 4 can alternatively be laminated on a surface of the porous film 5 which surface is on an anode 13 side, or both surfaces of the porous film 5.

Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in FIG. 3B, even in a case where the temperature of the lithium-ion secondary battery 1 sharply rises and as a result, the porous film 5 melts or softens, the shape of the porous film 5 is maintained because the heat-resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the separator 12 can be prevented from being destroyed.

(Production Steps of the Heat-Resistant Separator)

How to produce the heat-resistant separator of the lithium-ion secondary battery 1 is not specifically limited. The heat-resistant separator can be produced by a well-known method. The following discussion assumes a case where the porous film 5 contains polyethylene as a main material.

However, even in a case where the porous film 5 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the porous film 5 is made of a polyethylene resin containing ultrahigh molecular weight polyethylene, it is possible to produce the separator 12 by the following method.

This method includes (1) a kneading step of obtaining a polyethylene resin composition by kneading a ultrahigh molecular weight polyethylene and an inorganic filler such as calcium carbonate, (2) a rolling step of forming a film with the polyethylene resin composition, (3) a removal step of removing the inorganic filler from the film obtained in the step (2), and (4) a stretching step of obtaining the porous film 5 by stretching the film obtained in the step (3).

In the removal step, many fine pores are provided in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultrahigh molecular weight polyethylene, 5 parts by weight to 200 parts by weight of a low-molecular weight polyolefin having a weight-average molecular weight of 10000 or less, and 100 parts by weight to 400 parts by weight of the inorganic filler can be kneaded.

Thereafter, in a coating step, the heat-resistant layer 4 is formed on a surface of the porous film 5. For example, on the porous film 5, an aramid/NMP (N-methylpyrrolidone) solution (coating solution) is applied, and thereby, the heat-resistant layer 4 that is an aramid heat-resistant layer is formed. The heat-resistant layer 4 can be provided on only one surface or both surfaces of the porous film 5. Alternatively, the heat-resistant layer 4 can be formed by using a mixed solution containing a filler such as alumina/carboxymethyl cellulose for coating.

A method for coating the porous film 5 with a coating solution is not specifically limited as long as uniform wet coating can be performed by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film and a solid-content concentration in the coating solution.

It is possible to use a resin film, a metal belt, a drum or the like as a support with which the porous film 5 is fixed or transferred in coating.

As described above, it is possible to produce the separator 12 (heat-resistant separator) in which the heat-resistant layer 4 is laminated on the porous film 5. Thus produced separator is wound on a cylindrical core. Note that a subject to be produced by the above production method is not limited to the heat-resistant separator. The above production method does not necessarily include the coating step. In a case where the method includes no coating step, the subject to be produced is a separator that does not have a heat-resistant layer.

(Slitting Apparatus)

The heat-resistant separator or the separator having no heat-resistant layer (hereinafter, referred to as "separator") preferably has a width (hereinafter, referred to as "product width") suitable for application products such as the lithium-ion secondary battery 1. However, for improving productivity, the separator is produced so as to have a width that is equal to or larger than a product width. Then, after having been once produced so as to have a width equal to or larger than the product width, the separator is slit into a separator(s) having the product width.

Note that the "separator width" means a dimension of the separator in a direction substantially perpendicular to a lengthwise direction and a thickness direction of the separator. In the description below, a wide separator having not yet been slit is referred to as an "original sheet" while particularly a separator having been slit is referred to as a "slit separator". Moreover, "slit" means to cut off a separator in a lengthwise direction (i.e., a direction in which a film flows in production, MD: machine direction), and "cut" means to cut the separator in a transverse direction (TD). The transverse direction (TD) means a direction that is substantially perpendicular to the lengthwise direction (MD) and the thickness direction of the separator.

Figure 4A:
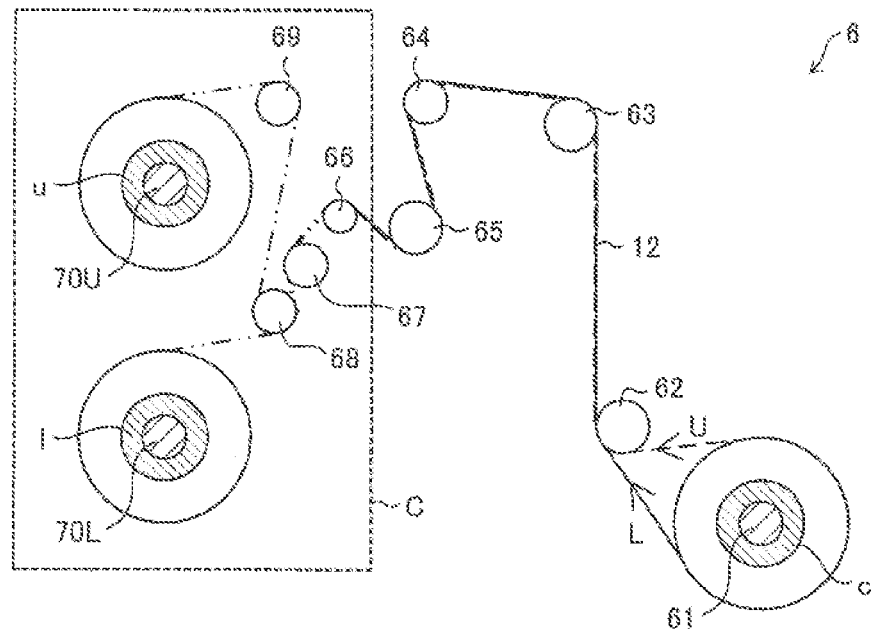
FIGS. 4A and 4B are schematic views illustrating a configuration of a slitting apparatus for slitting the separator.
Figure 4B:
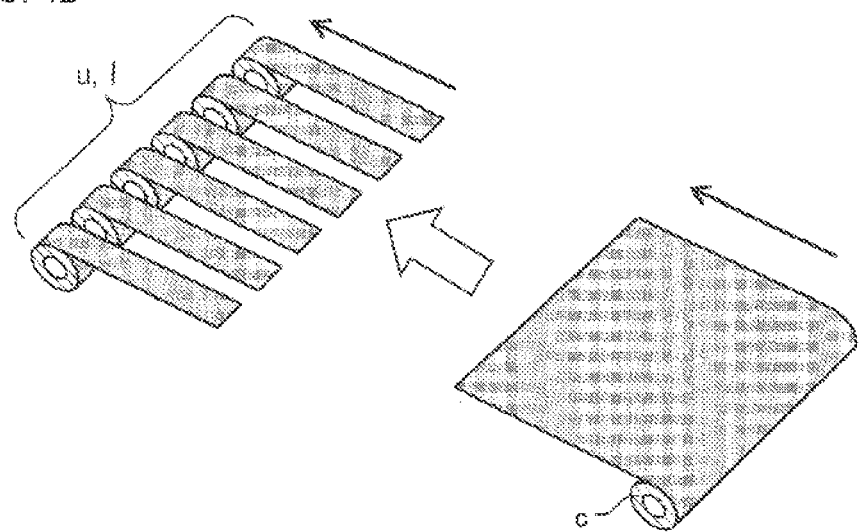

FIGS. 4A and 4B are schematic views illustrating a configuration of a slitting apparatus 6 for slitting the separator. FIG. 4A illustrates an entire configuration, and FIG. 4B illustrates an arrangement before and after slitting the original sheet.

As illustrated in FIG. 4A, the slitting apparatus 6 includes a rotatably-supported cylindrical wind-off roller 61, rollers 62 to 69, and take-up rollers 70U and 70L. The slitting apparatus 6 is further provided with the cutting device 7 described later.

(Before Slitting)

In the slitting apparatus 6, a cylindrical core c on which the original sheet is wrapped is fit on the wind-off roller 61. As illustrated in FIG. 4B, the original sheet is wound off from the core c to a route U or L. Thus unwound original sheet is conveyed to the roller 68 via the rollers 63 through 67. In the step of conveying the unwound original sheet, the original sheet is slit into slit separators.

(Cutting Device)

Figure 5A:
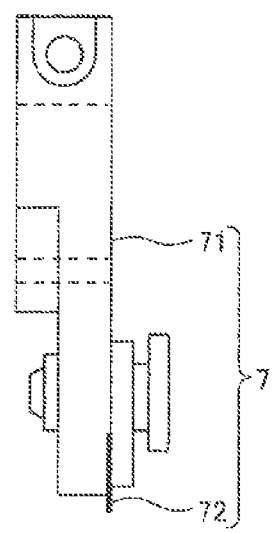
FIG. 5A is a side view and FIG. 5B is a front view illustrating a configuration of a cutting device of the slitting apparatus illustrated in FIGS. 4A and 4B.
Figure 5B:
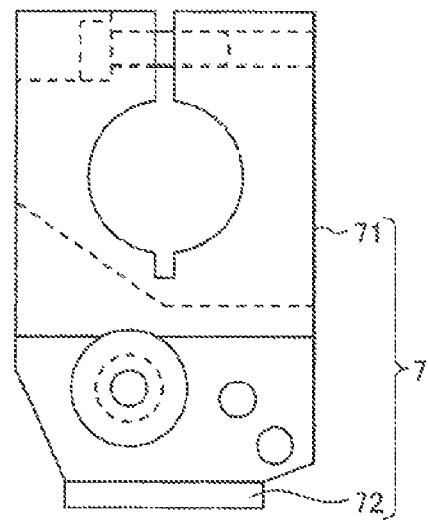

FIGS. 5A and 5B are views illustrating a configuration of the cutting device 7 of the slitting apparatus 6 as illustrated in FIG. 4A. FIG. 5A is a side view of the cutting device 7, and FIG. 5B is a front view of the cutting device 7.

As illustrated in FIGS. 5A and 5B, the cutting device 7 includes a holder 71 and a blade 72. The holder 71 is fixed to a housing or the like provided in the slitting apparatus 6. The holder 71 holds the blade 72 in a manner such that the blade 72 and the original sheet of the separator being conveyed have a fixed positional relation. The blade 72 has a finely sharpened edge and slits the original sheet of the separator by using this edge.

[Embodiment 1]

Figure 6:
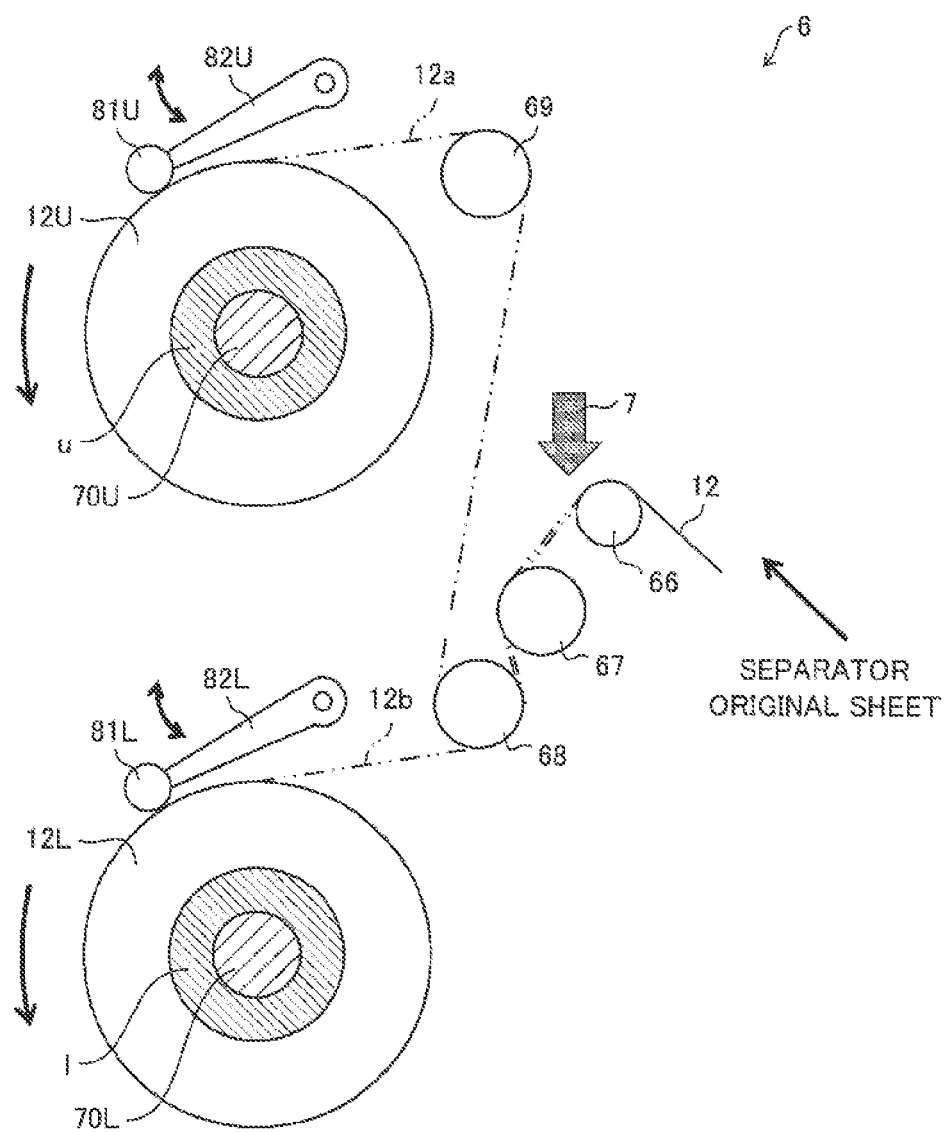
FIG. 6 is an enlarged view of the range C in FIG. 4A and illustrates a slitting apparatus in accordance with an embodiment of the present invention.

FIG. 6 is an enlarged view illustrating the range C in the slitting apparatus illustrated in FIG. 4A. The slitting apparatus 6 includes rollers 66 and 67, a direction changing roller 68, an assisting roller 69 (take-up assisting roller), a first touch roller 81U, a second touch roller 81L, a first arm 82U, a second arm 82L, a first take-up roller 70U, a second take-up roller 70L, and a plurality of cutting devices 7. The first touch roller 81U and the second touch roller 81L are rotatably provided at respective one ends of the first arm 82U and the second arm 82L. Each of the first arm 82U and the second arm 82L can rotationally swing around an axis located at the other end thereof.

Note that the slitting apparatus can be configured without providing the first touch roller 81U, the second touch roller 81L, the first arm 82U, and the second arm 82L.

An original sheet of a separator 12 which is long and has been conveyed is slit into a plurality of slit separators by the plurality of cutting devices 7 (slitting section) on, for example, an upstream side or a downstream side of the roller 66 (slitting step). Hereinafter, among the plurality of slit separators arranged side by side, each of odd-numbered slit separators is referred to as "first separator 12a", and each of even-numbered slit separators is referred to as "second separator 12b". The first separator 12a and the second separator 12b are conveyed to the direction changing roller 68 via the roller 67.

A holding angle of the first separator 12a on the direction changing roller 68 is different from a holding angle of the second separator 12b on the direction changing roller 68. Here, the holding angle means an angle of an arc, on which the separator makes contact with the roller, with respect to an axis of the roller. That is, directions in which a separator is conveyed before and after a roller vary by a holding angle of the roller. The direction changing roller 68 (i) changes a conveying direction of the first separator 12a toward a first take-up roller 70U side and (ii) changes a conveying direction of the second separator 12b toward a second take-up roller 70L side (direction changing step). The first separator 12a and the second separator 12b are to be conveyed in different directions by the direction changing roller 68.

The first take-up roller 70U (first take-up section) is provided with one or more cores u in a removable manner, depending on the number of the first separator(s) 12a. Similarly, the second take-up roller 70L (second take-up section) is provided with one or more cores 1 in a removable manner, depending on the number of the second separator(s) 12b.

The second separator 12b which has been conveyed toward the second take-up roller 70L side by the direction changing roller 68 is wound on the core 1, so that a second separator roll 12L is formed. The second take-up roller 70L rotates together with the core 1 so as to take up the second separator 12b (taking-up step).

The first separator 12a which has been conveyed toward the first take-up roller 70U side by the direction changing roller 68 is directed to a take-up position via the assisting roller 69 (conveying step). The first separator 12a is wound on the core u, so that a first separator roll 12U is formed. The first take-up roller 70U rotates together with the core u so as to take up the first separator 12a (taking-up step). The core can be removed from the take-up roller together with the separator roll that has been thus wound on the core.

The first touch roller 81U and the second touch roller 81L press respective of the first separator 12a and the second separator 12b toward take-up surfaces (front surfaces) of respective of the first separator roll 12U and the second separator roll 12L which are being wound (pressing step). Here, the first touch roller 81U and the second touch roller 81L press respective of the first separator 12a and the second separator 12b by their own weights. By thus pressing the first separator 12a and the second separator 12b by respective of the first touch roller 81U and the second touch roller 81L, it is possible to inhibit wrinkles and the like caused in the first separator 12a and the second separator 12b which are wound. Note that positions of the first touch roller 81U and the second touch roller 81L vary depending on changes in diameter of the first separator roll 12U and the second separator roll 12L so as to make contact with the respective take-up surfaces of the first separator roll 12U and the second separator roll 12L.

The first take-up roller 70U and the second take-up roller 70L are provided in respective different positions so that the separator rolls 12U and 12L which have been wound on the respective cores u and 1 do not make contact with each other. The first separator 12a and the second separator 12b are formed by slitting a single original sheet of separator, and therefore there is substantially no gap between the separator rolls 12U and 12L which are adjacent to each other in the transverse direction (TD). In a case where lateral surfaces (which are perpendicular to the shaft) of the separator rolls 12U and 12L make contact with each other, a scratch or fluff may occur on the lateral surfaces. In view of this, the first take-up roller 70U and the second take-up roller 70L are arranged far enough to a degree that the lateral surfaces of respective of the separator rolls 12U and 12L do not make contact with each other. In this case, the first take-up roller 70U and the second take-up roller 70L are arranged to have a positional relation of above and below in the slitting apparatus 6. By thus arranging the first take-up roller 70U and the second take-up roller 70L in the positional relation of above and below, it is possible to reduce a size of the slitting apparatus 6 in a horizontal direction. The first take-up roller 70U and the second take-up roller 70L do not need to be aligned in a vertical direction, and the "positional relation of above and below" indicates a positional relation in which the first take-up roller 70U and the second take-up roller 70L are not horizontally aligned.

The first take-up roller 70U and the second take-up roller 70L are arranged apart from each other by a predetermined distance. By this restriction of arrangement, (i) a conveying distance from the direction changing roller 68 to the take-up position and (ii) a roller-to-roller distance to any one of the first touch roller 81U and the second touch roller 81L become relatively long. Here, the conveying distance means a distance along a conveying route in a part in which a conveyed separator is not supported by a roller or a roll (i.e., the separator is in a free state). Moreover, the roller-to-roller distance means a distance (i) between two adjacent rollers on a conveying route of a separator and (ii) from a position at which the separator is off from an upstream one of the two rollers on the conveying route to a position at which the separator makes contact with a downstream one of the two rollers. In a case where (i) a conveying distance from a roller immediately before the take-up position to the take-up position is long or (ii) a roller-to-roller distance from a roller immediately before the touch roller to the touch roller is long, the separator is more likely to be deformed or to meander, and consequently the separator which is wound tends to have a wrinkle or misaligned winding. For example, in a case where the assisting roller 69 is not provided, a conveying distance from the direction changing roller 68 to the take-up position or a roller-to-roller distance from the direction changing roller 68 to the first touch roller 81U becomes long, and therefore a wrinkle or misaligned winding is more likely to occur in the first separator 12a which is wound. Here, the wrinkle indicates, for example, a wrinkle which occurs in the take-up surface of the separator roll (i.e., in a curved surface with which the touch roller makes contact). The misaligned winding indicates that a part of a separator is misaligned in an axis direction of a columnar separator roll. In a case where misaligned winding has been caused, lateral surfaces (which are perpendicular to the shaft) of the separator roll become uneven. Note that a separator (e.g., a heat-resistant separator) which is formed by coating a porous film with a layer such as a heat-resistant layer is more likely to be curled in the transverse direction. Under the circumstances, in order to inhibit a wrinkle caused by the curl, it is necessary to shorten a roller-to-roller distance to the touch roller. Moreover, in a case where the thickness of the separator is thin, a wrinkle easily occurs.

In view of this, the assisting roller 69 is provided between the direction changing roller 68 and the take-up position on the conveying route in order to shorten the conveying distance between the take-up position and a roller immediately before the take-up position. The assisting roller 69 does not make contact with the first separator roll 12U. In this case, the assisting roller 69 is arranged so that the conveying distance to the take-up position of the first separator roll 12U becomes identical with the conveying distance from the direction changing roller 68 to the take-up position of the second separator roll 12L. Moreover, an angle at which the first separator 12a is introduced from the assisting roller 69 to the first take-up roller 70U can be identical with an angle at which the second separator 12b is introduced from the direction changing roller 68 to the second take-up roller 70L. Moreover, for example, a positional relation of the assisting roller 69, the first touch roller 81U, and the first take-up roller 70U can be identical with a positional relation of the direction changing roller 68, the second touch roller 81L, and the second take-up roller 70L. This makes it possible to take up the first separator 12a and the second separator 12b under the same condition. From this, it is possible to prevent a difference between the first separator roll 12U and the second separator roll 12L in terms of wound-up state (i.e., quality such as a wrinkle and misaligned winding). Note that the direction changing roller 68, the assisting roller 69, the first take-up roller 70U, and the second take-up roller 70L are separated from the first touch roller 81U and the second touch roller 81L. That is, during production of the separator roll, positions of the direction changing roller 68, the assisting roller 69, the first take-up roller 70U, and the second take-up roller 70L are fixed. Only the first touch roller 81U and the second touch roller 81L need to be attached to the first arm 82U and the second arm 82L, respectively, as rollers. This makes it possible to simplify configurations of the first arm 82U and the second arm 82L which are movable parts.

By thus providing the assisting roller 69, the conveying distance between the take-up position of the first separator roll 12U and a roller (excluding the touch roller) immediately before the take-up position or the roller-to-roller distance between the first touch roller 81U and a roller immediately before the first touch roller 81U is shortened, and it is therefore possible to inhibit a wrinkle or misaligned winding caused in the first separator roll 12U. Moreover, the direction changing roller 68 is provided at a position that is nearer to the take-up position of the second separator roll 12L than to the take-up position of the first separator roll 12U or at a position nearer to the second touch roller 81L than to the first touch roller 81U (i.e., at a position at which the roller-to-roller distance becomes shorter). From this, it is possible to omit another assisting roller to be provided between (i) the take-up position of the second separator roll 12L or the second touch roller 81L and (ii) the direction changing roller 68.

Note that, in order to shorten the conveying distance between the take-up position of the first separator roll 12U and the assisting roller 69 as much as possible, the assisting roller 69 can be a fixed member (i.e., a roller whose position is fixed) which is provided nearest to the first take-up roller 70U in a radial direction. In this case, a maximum outer diameter of the first separator roll 12U that can be wound on the first take-up roller 70U is not restricted by the first touch roller 81U or the axis of the first arm 82U but is restricted by the assisting roller 69. For example, in a case where a distance from a center of the first take-up roller 70U to a surface of the assisting roller 69 is 300 mm, a maximum outer diameter of the first separator roll 12U is restricted to 600 mm. Note that, in order to obtain a greater maximum outer diameter, it is preferable that the diameter of the assisting roller 69 is small. For example, the diameter of the assisting roller 69 can be 60 mm or more and 100 mm or less, by taking into consideration rigidity and the like. Similarly, the direction changing roller 68 can be a fixed member (i.e., a roller whose position is fixed) which is provided nearest to the second take-up roller 70L in a radial direction. In this case, a maximum outer diameter of the second separator roll 12L that can be wound on the second take-up roller 70L is restricted by the direction changing roller 68.

FIGS. 14A, 14B, 14C and 14D are front views illustrating a plurality of configuration examples of concave rollers. In FIGS. 14A, 14B, 14C and 14D, a dashed dotted line represents an axis of the concave roller. Here, the assisting roller 69 can be a concave roller such as a reverse crown roller. The concave roller is a roller having a shape in which an outer diameter of its center part in the transverse direction (TD) is smaller than outer diameters of its both end parts. From this, a separator that is conveyed is stretched at the both end parts of the rotating concave roller, and it is thus possible to stretch a wrinkle which has been caused in the separator during the conveying. It is necessary to take up the separator while a wrinkle is stretched, and it is therefore preferable that a roller (assisting roller 69) immediately before the take-up position or the first touch roller 81U is the concave roller. The concave roller can have a curved shape in which the outer diameter gradually becomes larger toward the both end parts (see FIG. 14B), a straight line shape (see FIG. 14A), or a shape in which the outer diameter becomes larger step-by-step toward the both end parts (see FIG. 14C).

Note, however, that it is preferable to provide one (1) concave assisting roller 69 for one (1) first separator 12a and one (1) core u. In a case where a plurality of sets of the first separator 12a and the core u are arranged side by side, a plurality of concave assisting rollers 69 can be provided for the respective plurality of sets. Note that the plurality of assisting rollers 69 can include both a concave roller and a columnar roller that is not concave but is flat. Alternatively, in a case where one (1) assisting roller 69 conveys a plurality of first separators 12a, a surface of the assisting roller 69 can have a plurality of concave portions 90 at positions corresponding to the respective plurality of first separators 12a (see FIG. 14D).

Figure 15A:
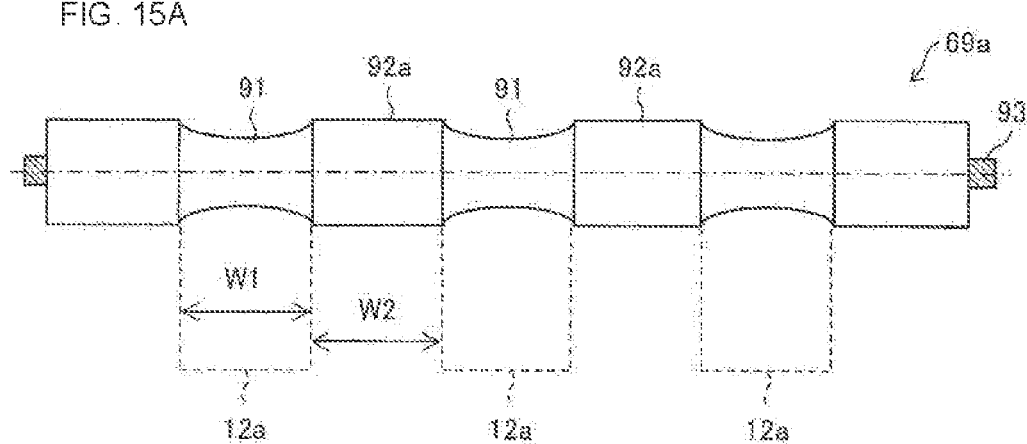
FIGS. 15A and 15B are front views illustrating another configuration example of a concave roller.
Figure 15B:
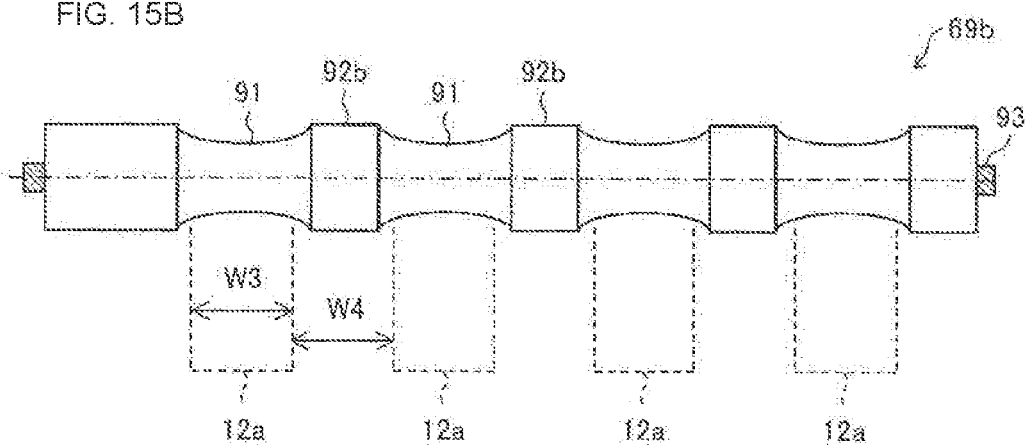

FIGS. 15A and 15B are front views illustrating another configuration example of the concave roller. As the assisting roller 69 having the plurality of concave portions, it is possible to employ an assisting roller 69a illustrated in FIG. 15A. The assisting roller 69a includes, as removable separated parts, a plurality of concave roller sections 91 and a plurality of flat roller sections 92a (spacer) having a columnar shape. The plurality of concave roller sections 91 and the plurality of flat roller sections 92a are alternately arranged, and are fixed to a rotation shaft 93 of the assisting roller 69a. The plurality of concave roller sections 91 is provided at respective positions which correspond to the plurality of first separators 12a. A width of the concave roller section 91 is preferably longer than a width W1 of each of the plurality of first separators 12a but is not limited to this. The plurality of first separators 12a are apart from each other by a width W2 that is a width of the second separator 12b. The plurality of flat roller sections 92a serve as spacers for adjusting the plurality of concave roller sections 91 to be apart from each other by a predetermined gap. By the plurality of flat roller sections 92a, the plurality of concave roller sections 91 are arranged at pitches identical with those of the plurality of first separators 12a, i.e., at pitches each of which is (W1+W2).

In a case where positions at which the original sheet of the separator 12 is slit are changed in the slitting apparatus 6, positions at which the first separators 12a pass through the assisting roller 69 are changed, accordingly. As in an assisting roller 69b illustrated in FIG. 15B, the plurality of flat roller sections 92a can be replaced with a plurality of flat roller sections 92b each of which has a width different from that of the plurality of flat roller sections 92a, in accordance with the change of slitting positions. "W3" indicates a width of the first separator 12a after the change, and "W4" indicates a width of the second separator 12b after the change. From this, the assisting roller 69b can appropriately convey, on the plurality of concave roller sections 91 arranged at corresponding positions, the plurality of first separators 12a which are arranged at pitches (W3+W4) different from those in FIG. 15A. By thus changing the flat roller sections 92a and 92b, which serve as spacers, in accordance with widths and positions of separators to be conveyed, it is possible to compatibly use the concave roller section 91. Note that it is possible to employ a configuration in which a plurality of flat roller sections 92a and 92b are provided between two concave roller sections 91.

In order to fill a gap, a thin plate spacer can be inserted as appropriate. Note that the concave roller section 91 can also be replaced with another concave roller section in accordance with a width of a separator or the like.

The direction changing roller 68 which is immediately before (i) the take-up position of the second separator roll 12L or (ii) the second touch roller 81L can be a concave roller. In a case where one (1) direction changing roller 68 having a concave shape is employed, the direction changing roller 68 can have a plurality of concave portions at positions corresponding to a plurality of first separators 12a and second separators 12b, as with the assisting roller 69 described above.

By thus using the concave roller as a roller immediately before the touch roller, it is possible to press the separator toward the take-up surface by the touch roller while a wrinkle is stretched. It is therefore possible to further inhibit a wrinkle, misaligned winding, or the like caused in the separator roll.

The first touch roller 81U presses the first separator 12a by its own weight, and therefore the first touch roller 81U is provided on an upper side of the first take-up roller 70U.

Meanwhile, the direction changing roller 68 which is provided for changing the conveying direction of the first separator 12a that has been slit by the cutting device 7 toward the first take-up roller 70U side (upper side) may be provided on a lower side of the first take-up roller 70U due to restriction of a size of the slitting apparatus 6. In a case where the first separator 12a is introduced to the first take-up roller 70U directly from the direction changing roller 68 that is located on the lower side of the first take-up roller 70U, a distance becomes long which is from (i) a position (take-up position) at which the first separator 12a makes contact with the take-up surface to (ii) the first touch roller 81U that is located on the upper side of the first take-up roller 70U. As a result, a wrinkle is more likely to occur in the take-up surface.

In view of this, the assisting roller 69 is provided on the upper side of the first take-up roller 70U, and this makes it possible to introduce the first separator 12a to the take-up surface from a height of the upper side of the take-up surface. From this, it is possible to shorten a distance from the position at which the first separator 12a makes contact with the take-up surface of the first separator roll 12U to the first touch roller 81U. This makes it possible to inhibit a wrinkle or misaligned winding caused in the first separator roll 12U. Here, heights of the rollers are compared to each other at positions at which conveyed separators respectively pass through. A height of an upper end of the assisting roller 69 (i.e., a highest point of an arc with which the first separator 12a makes contact) only needs to be upper than the upper end of the core u that is provided on the first take-up roller 70U. Moreover, a height of a lower end of the direction changing roller 68 (i.e., a lowest point of an arc with which the first separator 12a makes contact) only needs to be lower than (i) the upper end of the first take-up roller 70U or (ii) the upper end of the core u that is provided on the first take-up roller 70U. As winding continues, the diameter of the first separator roll 12U becomes larger, and therefore the take-up position becomes higher. However, provided that the rollers satisfy the above described conditions, the first separator 12a can be introduced to the take-up surface from the height upper than the take-up position during at least the diameter of the first separator roll 12U is within the predetermined range. Further it is preferable that production of the first separator roll 12U is completed while the upper end of the first separator roll 12U is lower than the upper end of the assisting roller 69. The first separator roll 12U which has been completely produced is removed from the first take-up roller 70U together with the core u.

Similarly, a height of the lower end of the direction changing roller 68 (i.e., a lowest point of an arc with which the first separator 12a makes contact) is preferably upper than the upper end of the core 1 provided on the second take-up roller 70L.

Note that it is possible to employ a configuration in which a position of the first touch roller 81U is shifted toward the assisting roller 69 so that the first separator 12a conveyed from the assisting roller 69 makes contact with the first touch roller 81U before contacting with the take-up surface of the first separator roll 12U. The same applies to the second touch roller 81L. From this, it is possible to press separators onto the respective take-up surfaces while stretching wrinkles in the separators on surfaces of the first touch roller 81U and the second touch roller 81L.

Note that the first touch roller 81U can be configured to press the first separator 12a onto the take-up surface from a lateral side or a lower side of the first separator roll 12U. In this case, for example, the slitting apparatus 6 can be provided with a mechanism such as a spring or an air cylinder for applying force to the first arm 82U. The same applies to the second touch roller 81L.

According to the present embodiment, the effect of inhibiting a wrinkle or misaligned winding is particularly suitable for a separator that is used in a battery. A separator (in particular, a separator coated with a layer) tends to have uneven film thickness distribution, and therefore a wrinkle or misaligned winding is more likely to occur when taking up the separator. Meanwhile, in a case where a wrinkle or misaligned winding is caused in a separator roll, the separator easily meanders when the separator is wound off in a battery production process. In a case where the separator meanders, defect is caused in lamination of a positive electrode film and a negative electrode film between which the separator is provided. As such, the separator roll is highly demanded to have less wrinkles and less misaligned winding, and it is therefore necessary to provide the assisting roller 69. The present embodiment is applicable (i) to a single-layer separator that does not have a heat-resistant layer and (ii) also to a heat-resistant separator having a heat-resistant layer.

[Embodiment 2]

The following description will discuss another embodiment of the present invention. Note that, for convenience of explanation, identical reference numerals are given to members which have respective functions identical with those described in Embodiment 1, and descriptions of the respective members are omitted.

Figure 7:
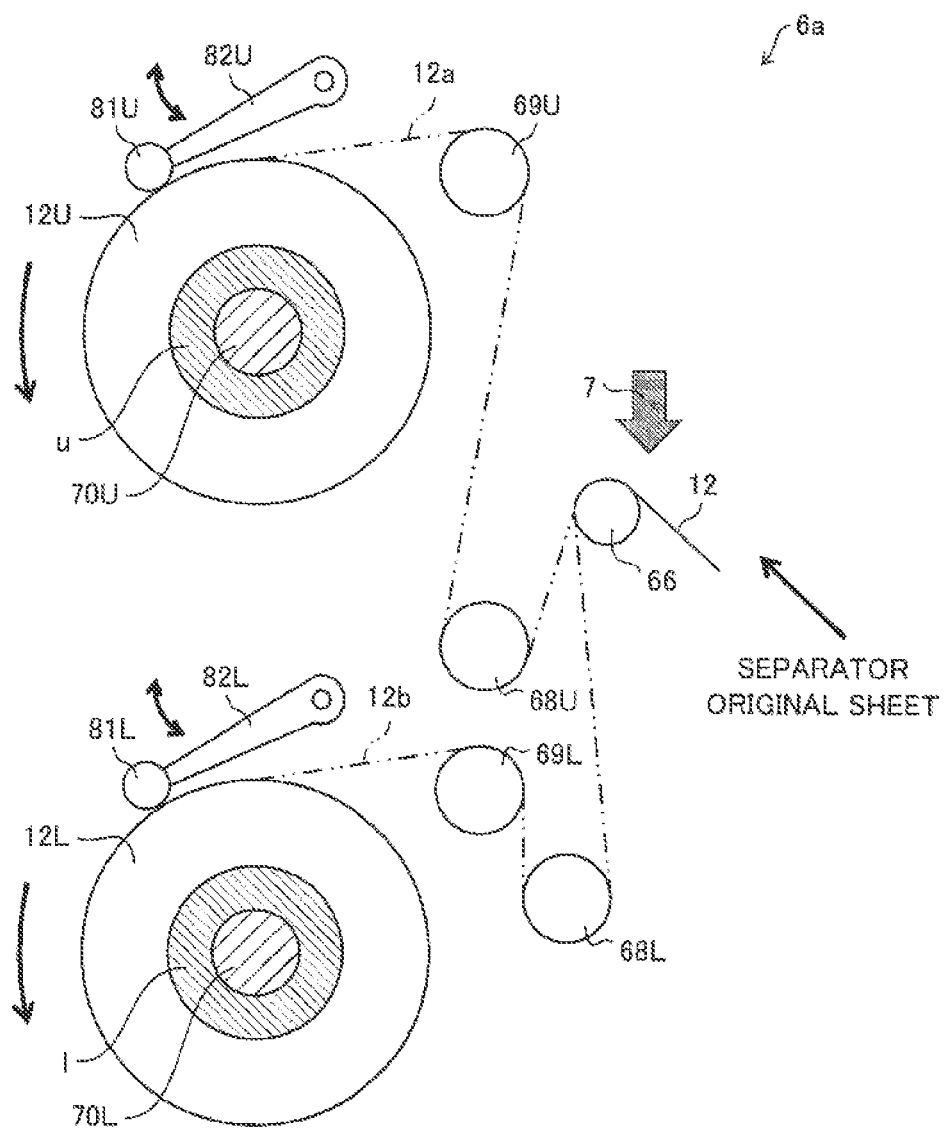
FIG. 7 is an enlarged view partially illustrating a slitting apparatus in accordance with another embodiment of the present invention.

FIG. 7 is an enlarged view partially illustrating a slitting apparatus 6a in accordance with the present embodiment, as with FIG. 6. The slitting apparatus 6a includes a roller 66, a first direction changing roller 68U, a second direction changing roller 68L, a first assisting roller 69U (first take-up assisting roller), a second assisting roller 69L (second take-up assisting roller), a first touch roller 81U, a second touch roller 81L, a first arm 82U, a second arm 82L, a first take-up roller 70U, a second take-up roller 70L, and a plurality of cutting devices 7.

Note that the slitting apparatus can be configured without providing the first touch roller 81U, the second touch roller 81L, the first arm 82U, and the second arm 82L.

An original sheet of a separator 12 which has been conveyed is slit into a plurality of slit separators (first separators 12a and second separators 12b) by the plurality of cutting devices 7 (slitting section) on, for example, an upstream side of the roller 66. The first separator 12a and the second separator 12b are to be conveyed in different directions by the roller 66.

A lower end of the first direction changing roller 68U is located lower than an upper end of the roller 66 and an upper end of a core u that is provided on the first take-up roller 70U. The first direction changing roller 68U is provided for changing the conveying direction of the first separator 12a toward an upper side (i.e., first take-up roller 70U side).

An upper end of the first assisting roller 69U is located upper than a lower end of the first direction changing roller 68U and an upper end of a core u that is provided on the first take-up roller 70U. The first assisting roller 69U is provided, on a conveying route, between the take-up position of the first separator roll 12U or the first touch roller 81U and the first direction changing roller 68U so as to shorten (i) a conveying distance between the take-up position of the first separator roll 12U and a roller immediately before the take-up position or (ii) a roller-to-roller distance between the first touch roller 81U and a roller immediately before the first touch roller 81U. The first assisting roller 69U is provided to introduce the first separator 12a to the take-up surface from a height upper than the take-up position.

A lower end of the second direction changing roller 68L is located lower than an upper end of the roller 66, an upper end of the second take-up roller 70L, and an upper end of a core 1 that is provided on the second take-up roller 70L. The second direction changing roller 68L is provided to change a conveying direction of the second separator 12b toward an upper side (i.e., second take-up roller 70L side).

An upper end of the second assisting roller 69L is located upper than the lower end of the second direction changing roller 68L and the upper end of the core 1 that is provided on the second take-up roller 70L. The second assisting roller 69L is provided, on a conveying route, between a take-up position of the second separator roll 12L or the second touch roller 81L and the second direction changing roller 68L so as to shorten (i) a conveying distance between the take-up position of the second separator roll 12L and a roller immediately before the take-up position or (ii) a roller-to-roller distance between the second touch roller 81L and a roller immediately before the second touch roller 81L. The second assisting roller 69L is provided to introduce the second separator 12b to a take-up surface from a height upper than the take-up position.

The first assisting roller 69U and the second assisting roller 69L are arranged so that the conveying distance to the take-up position of the first separator roll 12U becomes identical with the conveying distance to the take-up position of the second separator roll 12L. Moreover, the first assisting roller 69U and the second assisting roller 69L are arranged so that the roller-to-roller distance to the first touch roller 81U becomes identical with the roller-to-roller distance to the second touch roller 81L.

A positional relation of the first assisting roller 69U, the first touch roller 81U, and the first take-up roller 70U can be identical with a positional relation of the second assisting roller 69L, the second touch roller 81L, and the second take-up roller 70L. The first separator 12a and the second separator 12b are conveyed on upper sides of the first assisting roller 69U and the second assisting roller 69L, respectively. This makes it possible to take up the first separator 12a and the second separator 12b under the same condition. Note that, during production of the separator roll, positions of the first direction changing roller 68U, the second direction changing roller 68L, the first assisting roller 69U, the second assisting roller 69L, the first take-up roller 70U, and the second take-up roller 70L are fixed.

By thus providing the first assisting roller 69U and the second assisting roller 69L, the conveying distance between each of the take-up positions of the first separator roll 12U and the second separator roll 12L and a roller (excluding the touch roller) immediately before the take-up position or the roller-to-roller distance between each of the first touch roller 81U and the second touch roller 81L and a roller immediately before the each of the first touch roller 81U and the second touch roller 81L is shortened, and it is therefore possible to inhibit wrinkles or misaligned winding caused in the first separator roll 12U and the second separator roll 12L. Moreover, by providing the second assisting roller 69L, it is possible to increase a degree of freedom of the position at which the second direction changing roller 68L is provided.

According to the present embodiment, each of the first assisting roller 69U and the second assisting roller 69L can be a concave roller such as a reverse crown roller. It is necessary to take up the separator while a wrinkle is stretched, and it is therefore preferable that rollers (first assisting roller 69U and second assisting roller 69L) immediately before (i) the take-up positions of the first separator roll 12U and the second separator roll 12L or (ii) the first touch roller 81U and the second touch roller 81L are the concave rollers.

In a case where a plurality of sets of the first separator 12a and the core u are arranged side by side, a plurality of concave first assisting rollers 69U can be provided for the respective plurality of sets. Note that the plurality of first assisting rollers 69U can include both a concave roller and a columnar roller that is not concave but is flat. Alternatively, in a case where one (1) first assisting roller 69U conveys a plurality of first separators 12a, the first assisting roller 69U can have a plurality of concave portions at positions corresponding to the respective plurality of first separators 12a. The same applies to the second assisting roller 69L.

[Embodiment 3]

The following description will discuss still another embodiment of the present invention. Note that, for convenience of explanation, identical reference numerals are given to members which have respective functions identical with those described in the above embodiments, and descriptions of the respective members are omitted.

Figure 8:
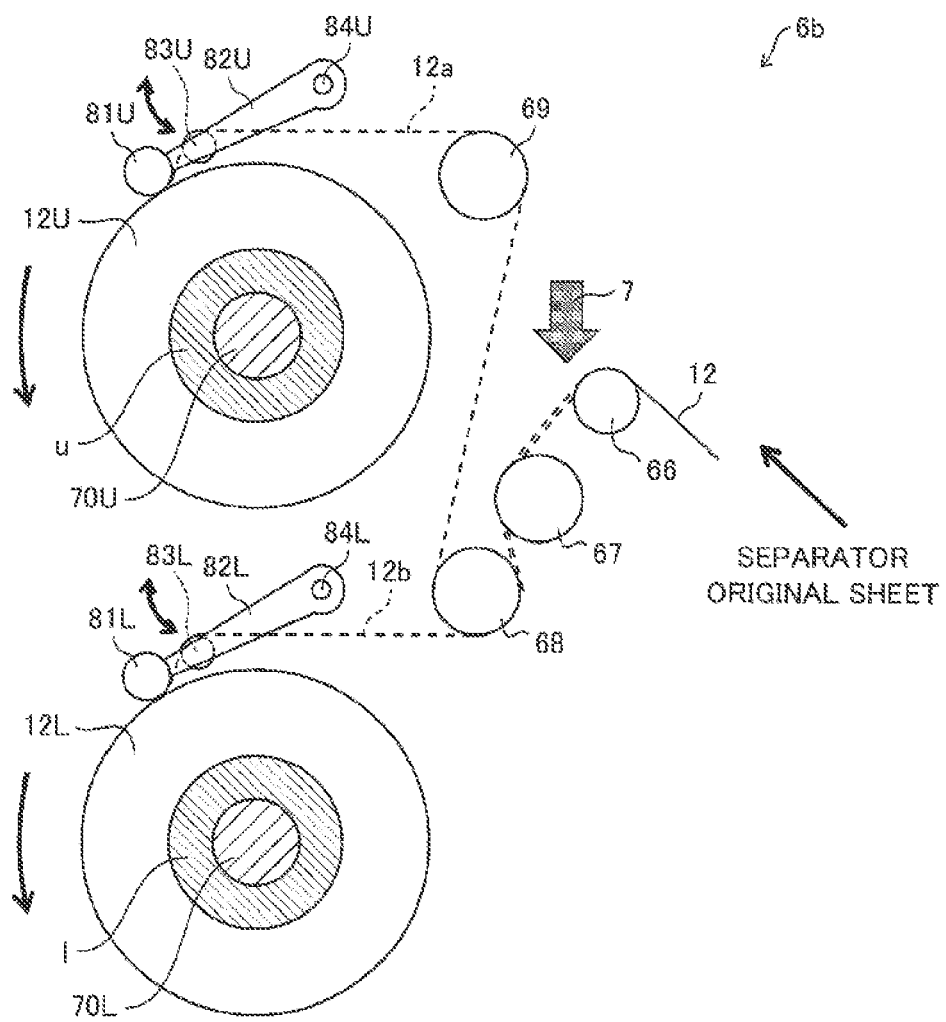
FIG. 8 is an enlarged view of the range C in FIG. 4A and illustrates a slitting apparatus in accordance with still another embodiment of the present invention.

FIG. 8 is an enlarged view partially illustrating a slitting apparatus 6b in accordance with the present embodiment, as with FIG. 6. Arrows in FIG. 8 indicate flows of separators and movements of arms. The slitting apparatus 6b includes rollers 66 and 67, a direction changing roller 68, an assisting roller 69, a first touch roller 81U, a second touch roller 81L, a first arm 82U, a second arm 82L, a first take-up assisting roller 83U, a second take-up assisting roller 83L, a first take-up roller 70U a second take-up roller 70L, and a plurality of cutting devices 7. The rollers 66 and 67, the direction changing roller 68, and the assisting roller 69 are provided so as to convey separators. The first touch roller 81U and the second touch roller 81L are rotatably provided (fixed) at respective one ends of the first arm 82U and the second arm 82L. The first arm 82U and the second arm 82L can rotationally swing around rotation shafts 84U and 84L (shaft), respectively, which are provided at the other ends thereof. The first take-up assisting roller 83U is provided between the first touch roller 81U and the rotation shaft 84U of the first arm 82U and is rotatably fixed to the first arm 82U. The second take-up assisting roller 83L is provided between the second touch roller 81L and the rotation shaft 84L of the second arm 82L and is rotatably fixed to the second arm 82L.

An original sheet of a separator 12 which is long and has been conveyed is slit into a plurality of slit separators by the plurality of cutting devices 7 (slitting section) on, for example, an upstream side or a downstream side of the roller 66 (slitting step). Hereinafter, among the plurality of slit separators arranged side by side, each of odd-numbered slit separators is referred to as "first separator 12a", and each of even-numbered slit separators is referred to as "second separator 12b". The first separator 12a and the second separator 12b are conveyed to the direction changing roller 68 via the roller 67.

A holding angle of the first separator 12a on the direction changing roller 68 is different from a holding angle of the second separator 12b on the direction changing roller 68. Here, the holding angle means an angle of an arc, on which the the separator makes contact with the roller, with respect to an axis of the roller. That is, directions in which a separator is conveyed before and after a roller vary by a holding angle of the roller. The direction changing roller 68 (i) changes a conveying direction of the first separator 12a toward a first take-up roller 70U side and (ii) changes a conveying direction of the second separator 12b toward a second take-up roller 70L side (direction changing step). The first separator 12a and the second separator 12b are to be conveyed in different directions by the direction changing roller 68.

The first take-up roller 70U (take-up section) is provided with one or more cores u in a removable manner, depending on the number of the first separator(s) 12a. Similarly, the second take-up roller 70L (take-up section) is provided with one or more cores 1 in a removable manner, depending on the number of the second separator(s) 12b.

The first separator 12a which has been conveyed toward the first take-up roller 70U side by the direction changing roller 68 is conveyed by the assisting roller 69. The first separator 12a is conveyed from the assisting roller 69 via the first take-up assisting roller 83U and the first touch roller 81U (conveying step), and is then introduced to a take-up surface.

The first separator 12a is wound on a core u, so that a first separator roll 12U is formed. The first take-up roller 70U rotates together with the core u so as to take up the first separator 12a (taking-up step). The core can be removed from the take-up roller together with the separator roll that has been wound on the core.

The second separator 12b which has been conveyed by the direction changing roller 68 to the second take-up roller 70L side is conveyed via the second take-up assisting roller 83L and the second touch roller 81L (conveying step), and is then introduced to a take-up surface. The second separator 12b is wound on a core 1, so that a second separator roll 12L is formed. The second take-up roller 70L rotates together with the core 1 so as to take up the second separator 12b (taking-up step).

Note that the first touch roller 81U and the second touch roller 81L press respective of the first separator 12a and the second separator 12b toward take-up surfaces (front surfaces) of respective of the first separator roll 12U and the second separator roll 12L (pressing step). Here, the first touch roller 81U and the second touch roller 81L press respective of the first separator 12a and the second separator 12b by their own weights. By thus pressing the first separator 12a and the second separator 12b by respective of the first touch roller 81U and the second touch roller 81L, it is possible to inhibit wrinkles and the like caused in the first separator 12a and the second separator 12b which are wound. Note that positions of the first touch roller 81U and the second touch roller 81L are changed (displaced) depending on changes in outer diameter of the first separator roll 12U and the second separator roll 12L so as to make contact with the respective take-up surfaces of the first separator roll 12U and the second separator roll 12L.

The first take-up roller 70U and the second take-up roller 70L are provided in respective different positions so that the first separator roll 12U and the second separator roll 12L which have been wound on the respective cores u and 1 do not make contact with each other. The first separator 12a and the second separator 12b are formed by slitting a single original sheet of separator, and therefore there is substantially no gap between the first separator roll 12U and the second separator roll 12L which are adjacent to each other in the transverse direction (TD). In a case where lateral surfaces (which are perpendicular to the shaft) of the first separator roll 12U and the second separator roll 12L make contact with each other, a scratch or fluff may occur on the lateral surfaces. Therefore, the first take-up roller 70U and the second take-up roller 70L are arranged far enough to a degree that the lateral surfaces of respective of the first separator roll 12U and the second separator roll 12L do not make contact with each other. In this case, the first take-up roller 70U and the second take-up roller 70L are arranged to have a positional relation of above and below in the slitting apparatus 6b. By thus arranging the first take-up roller 70U and the second take-up roller 70L in the positional relation of above and below, it is possible to reduce a size of the slitting apparatus 6b in a horizontal direction. The first take-up roller 70U and the second take-up roller 70L do not need to be aligned in a vertical direction, and the "positional relation of above and below" indicates a positional relation in which the first take-up roller 70U and the second take-up roller 70L are not horizontally aligned.

The first take-up roller 70U and the second take-up roller 70L are arranged apart from each other by a predetermined distance. By this restriction of arrangement, a roller-to-roller distance from the assisting roller 69 to the first touch roller 81U or a roller-to-roller distance from the direction changing roller 68 to the second touch roller 81L becomes relatively long. Here, the roller-to-roller distance means a distance (i) between two adjacent rollers on a conveying route of a separator and (ii) from a position at which the separator is off from an upstream one of the two rollers on the conveying route to a position at which the separator makes contact with a downstream one of the two rollers. In a case where a roller-to-roller distance from a roller immediately before a touch roller to the touch roller is long, the separator is more likely to be deformed or to meander, and consequently the separator which is wound tends to have a wrinkle or misaligned winding. Here, the wrinkle indicates, for example, a wrinkle which occurs in the take-up surface of the separator roll (i.e., in a curved surface with which the touch roller makes contact). The misaligned winding indicates that a part of a separator is misaligned in an axis direction of a columnar separator roll. In a case where misaligned winding has been caused, lateral surfaces (which are perpendicular to the shaft) of the separator roll become uneven. Note that a separator (e.g., a heat-resistant separator) which is formed by coating a porous film with a layer such as a heat-resistant layer is more likely to be curled in the transverse direction. Under the circumstances, in order to inhibit a wrinkle caused by the curl, it is necessary to shorten a roller-to-roller distance to the touch roller. Moreover, in a case where the thickness of the separator is thin, a wrinkle easily occurs.

(Change in Position of Touch Roller)

Figure 9:
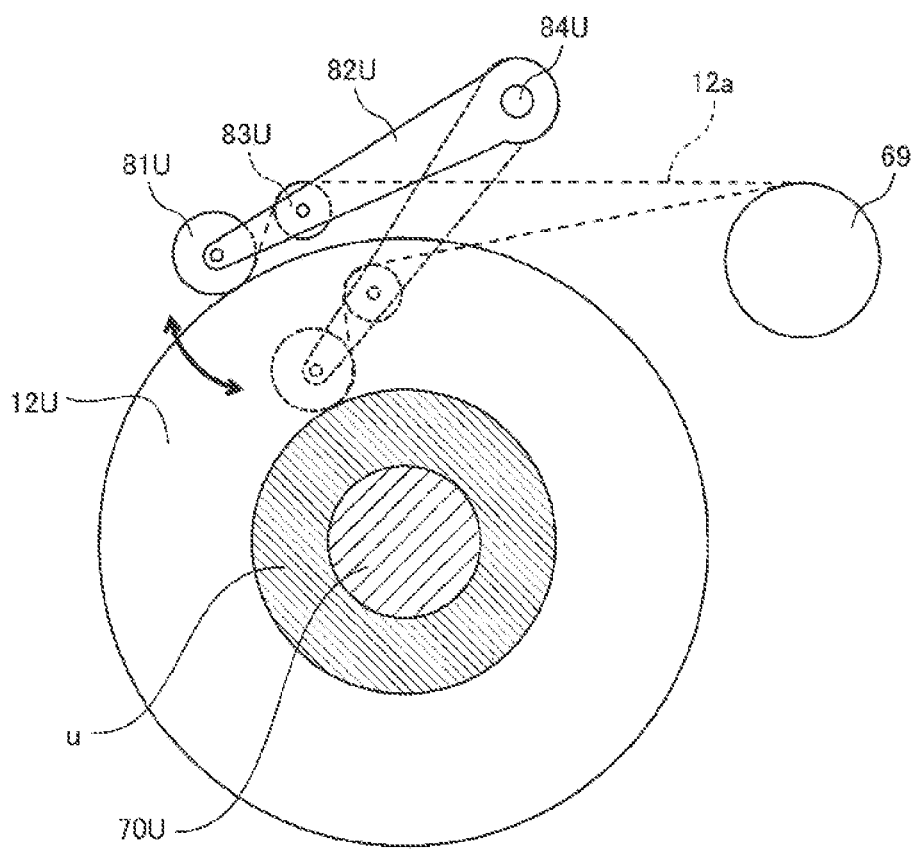
FIG. 9 is an enlarged view illustrating a part relating to a first touch roller and a first take-up assisting roller in the slitting apparatus.

FIG. 9 is an enlarged view illustrating a part relating to the first touch roller 81U and the first take-up assisting roller 83U in the slitting apparatus 6b. In FIG. 9, dotted lines indicate positions of the first touch roller 81U, the first take-up assisting roller 83U, and the first arm 82U at a beginning of winding the first separator 12a on the core u. In the present embodiment, the first take-up assisting roller 83U is provided, on the conveying route, between the assisting roller 69 and the first touch roller 81U so as to shorten the roller-to-roller distance to the first touch roller 81U. The first take-up assisting roller 83U does not make contact with the first separator roll 12U. The first take-up assisting roller 83U is fixed to the first arm 82U, and therefore a position of the first take-up assisting roller 83U is changed in accordance with positional change of the first touch roller 81U that makes contact with the first separator roll 12U. That is, a distance between the first take-up assisting roller 83U and the first touch roller 81U is retained constant, regardless of an outer diameter of the first separator roll 12U. In this case, the first arm 82U is configured to rotate around its rotation axis. Note, however, that the first arm 82U can be configured to move (be displaced) in parallel in accordance with positional change of the first touch roller 81U.

The first separator 12a passes through on the first take-up assisting roller 83U on an upper side (which is an opposite side of the first separator roll 12U), then passes through between the first take-up assisting roller 83U and the first touch roller 81U, then passes through between the first touch roller 81U and the first separator roll 12U, and is then wound. That is, with respect to a plane including the rotation shaft of the first touch roller 81U and the rotation shaft of the first take-up assisting roller 83U, the first separator 12a passes through on the first take-up assisting roller 83U on one side, and passes through on the first touch roller 81U on the other side. The first separator 12a which has been conveyed from the first take-up assisting roller 83U makes contact with the first touch roller 81U before making contact with the take-up surface. The first separator 12a which is being conveyed on the first touch roller 81U is pressed onto the take-up surface in a state in which a wrinkle is stretched (i.e., in a state of no wrinkle).

The second take-up assisting roller 83L has a configuration similar to that of the first take-up assisting roller 83U. Note that the direction changing roller 68, the assisting roller 69, the first take-up roller 70U, and the second take-up roller 70L are separated from the first touch roller 81U and the second touch roller 81L. That is, during production of a separator roll, positions of the direction changing roller 68, the assisting roller 69, the first take-up roller 70U, and the second take-up roller 70L are fixed regardless of outer diameters of respective of the first separator roll 12U and the second separator roll 12L.

By providing the first take-up assisting roller 83U, whose position is changed in accordance with positional change of the first touch roller 81U, immediately before the first touch roller 81U, it is possible to shorten the roller-to-roller distance between the first touch roller 81U and a roller immediately before the first touch roller 81U. This makes it possible to inhibit a wrinkle or misaligned winding caused in the first separator roll 12U.

Note that the first touch roller 81U can be configured to press the first separator 12a onto the take-up surface from a lateral side or a lower side of the first separator roll 12U. In this case, for example, the slitting apparatus 6b can be provided with a mechanism such as a spring or an air cylinder for applying force to the first arm 82U. The same applies to the second touch roller 81L.

(Attaching Position of Take-Up Assisting Roller)

Figure 10:
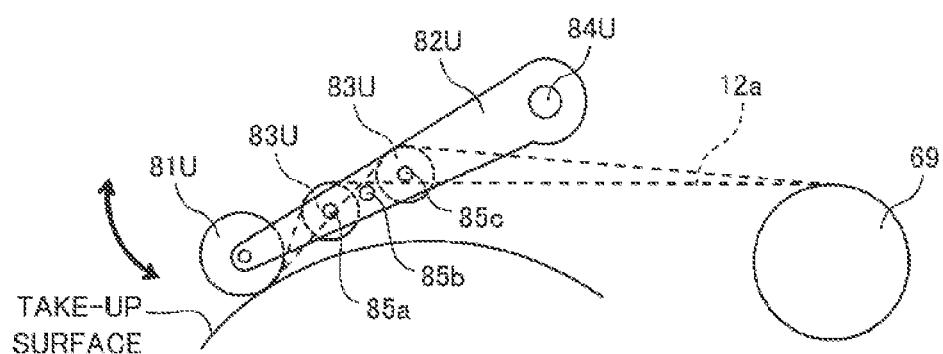
FIG. 10 is an enlarged view illustrating a part relating to a first touch roller and a first take-up assisting roller in the slitting apparatus.

FIG. 10 is an enlarged view illustrating a part relating to the first touch roller 81U and the first take-up assisting roller 83U in the slitting apparatus 6b. FIG. 10 illustrates a plurality of positions for attaching the first take-up assisting roller 83U. The first arm 82U has roller attaching sections 85a through 85c for attaching the first take-up assisting roller 83U. Each of the roller attaching sections 85a through 85c can be, for example, a bearing for rotatably supporting the first take-up assisting roller 83U or a hole for fixing the bearing. A user sets the first take-up assisting roller 83U in one roller attaching section which has been selected in advance from the roller attaching sections 85a through 85c. From this, the user can select one of a plurality of distances between the first touch roller 81U and the first take-up assisting roller 83U. FIG. 10 illustrates both (i) a state in which the first take-up assisting roller 83U is attached to the roller attaching section 85a and (ii) a state in which the first take-up assisting roller 83U is attached to the roller attaching section 85c.

By changing the attaching position of the first take-up assisting roller 83U, it is possible to change a roller-to-roller distance between the first touch roller 81U and the first take-up assisting roller 83U and a position at which the first separator 12a makes contact with the first touch roller 81U. A wound state of the separator roll (i.e., a state of a wrinkle or misaligned winding) can be changed by a characteristic (physical property) of the separator. In the present embodiment, it is possible to adjust the wound state of the first separator roll 12U by changing the distance between the first touch roller 81U and the first take-up assisting roller 83U. Note that the second arm 82L can have a configuration similar to that of the first arm 82U.

(Arrangement of a Plurality of Touch Rollers)

Figure 11:
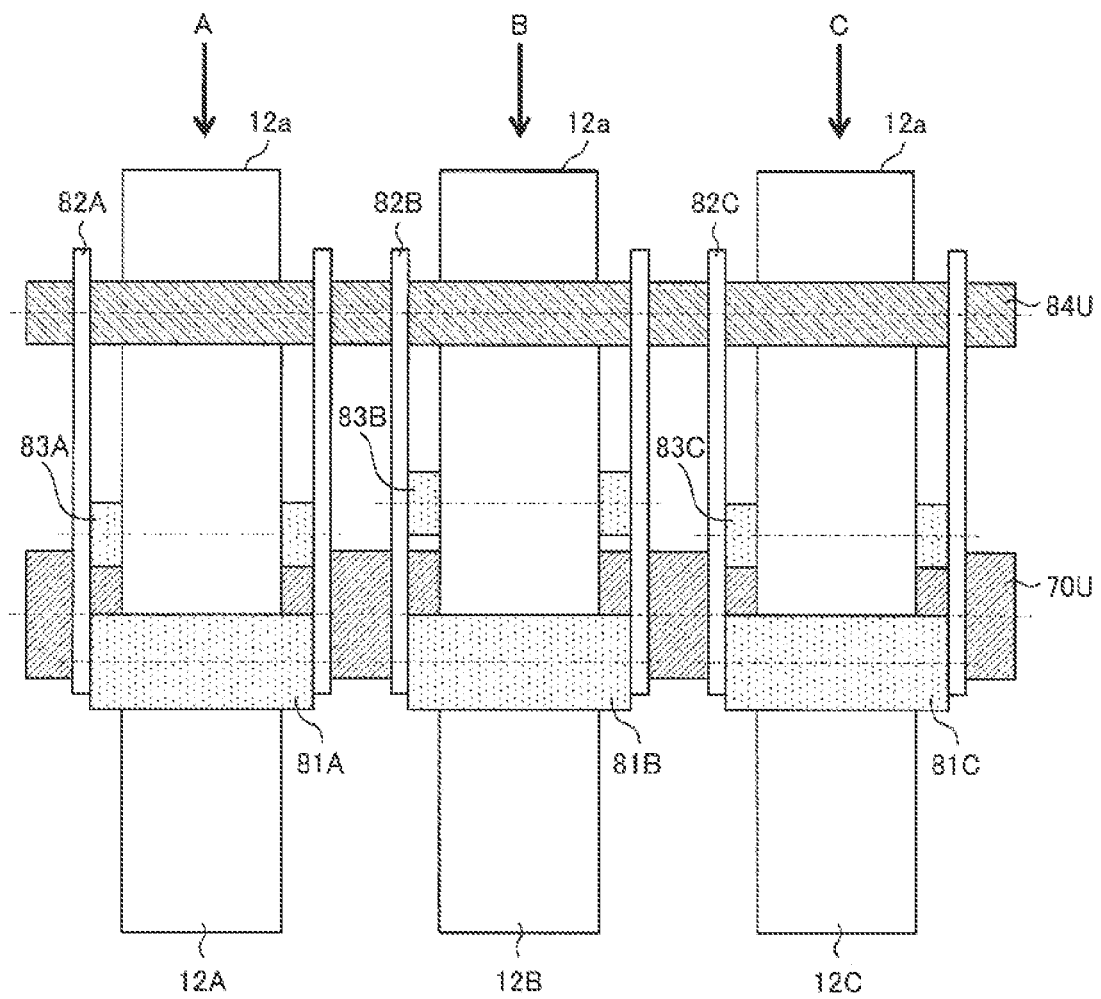
FIG. 11 is a plan view which is viewed from above and illustrates a part relating to first touch rollers and first take-up assisting rollers in the slitting apparatus.

FIG. 11 is a plan view which is viewed from above and illustrates a part relating to the first touch roller and the first take-up assisting roller in the slitting apparatus 6b. In FIG. 11, dashed dotted lines represent axes. Note that the second touch roller, the second take-up assisting roller, and the like are similarly configured, and therefore only the first touch roller and the like are explained here. A plurality of first separators 12a are wound as first separator rolls 12A through 12C, respectively. In FIG. 11, arrows represent flows of the first separators 12a in respective three rows (A through C). On one (1) rotation shaft 84U, first arms 82A through 82C are provided. The first arms 82A through 82C can separately and independently rotate around the rotation shaft 84U. Each of the first arms 82A through 82C includes two arm parts which are provided on both sides of corresponding one of the first touch rollers 81A through 81C. The first touch rollers 81A through 81C are rotatably fixed to the respective first arms 82A through 82C, and the first take-up assisting rollers 83A through 83C are also rotatably fixed to the respective first arms 82A through 82C.

The first take-up roller 70U is one (1) rotation shaft that holds a plurality of cores. The first take-up roller 70U is rotated by a driving motor (not illustrated) or the like. The one (1) first take-up roller 70U and the plurality of cores fixed to the first take-up roller 70U rotate as a unit. On the plurality of cores, the first separator rolls 12A through 12C are formed, respectively. The first touch rollers 81A through 81C are provided for the respective first separator rolls 12A through 12C.

As such, the first touch rollers 81A through 81C are provided for the one (1) first take-up roller 70U. The first arms 82A through 82C can separately rotate, and therefore positions of the first touch rollers 81A through 81C are separately changed in accordance with changes in outer diameter of the respective first separator rolls 12A through 12C. In a case where thickness distribution of the original sheet of separator is not uniform in the transverse direction (TD), the first separator rolls 12A through 12C may have respective different outer diameters. Even in such a case, in the present embodiment, positions of the first touch rollers 81A through 81C are separately changed in accordance with changes in outer diameter of the respective first separator rolls 12A through 12C. It is therefore possible to prevent a gap (space) from occurring between the first touch roller and the first separator roll. From this, it is possible to presses the plurality of first separators onto respective take-up surfaces by the respective first touch rollers.

As illustrated in FIG. 11, attaching positions of the respective first take-up assisting rollers 83A through 83C can be different from each other for the respective first arms. In a case where thickness distribution of the original sheet of separator is not uniform, a first separator 12a which passes through on the first take-up assisting roller 83A can have a thickness different from that of a first separator 12a which passes through on the first take-up assisting roller 83B. Moreover, besides the thickness, other physical property can be different. The user can adjust the wound states of the first separator rolls 12A through 12C by changing positions of the respective first take-up assisting rollers 83A through 83C in accordance with the respective states of the corresponding rows A through C.

Figure 14A:
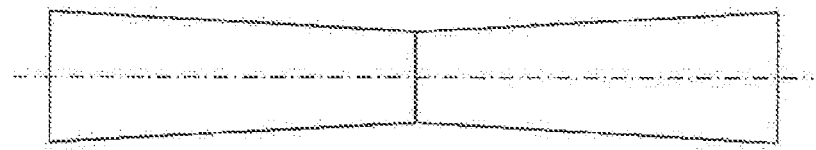
FIGS. 14A, 14B, 14C and 14D are front views illustrating a configuration example of a concave roller in accordance with an embodiment of the present invention.
Figure 14B:
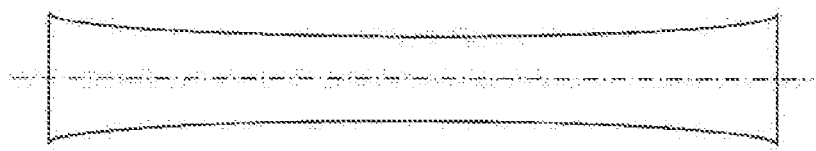
Figure 14C:
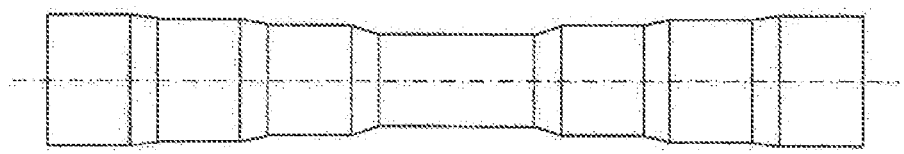
Figure 14D:
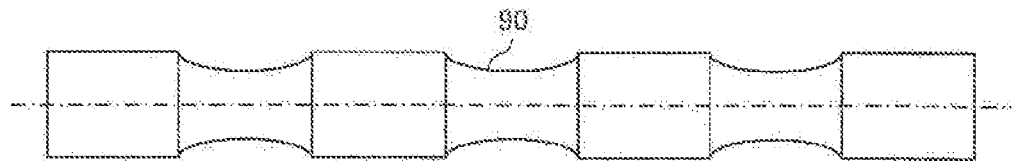

In the present embodiment, each of the first take-up assisting rollers 83U and 83A through 83C can be a concave roller as illustrated in FIGS. 14A, 14B and 14C. It is preferable that a roller (first take-up assisting rollers 83U, 83A through 83C) immediately before the first touch roller 81U is a concave roller. A position of the first take-up assisting roller 83U which has a concave shape and is provided on the first arm 82U is similarly changed in accordance with positional change of the first touch roller 81U. It is therefore possible to keep a short roller-to-roller distance between the first take-up assisting roller 83U and the first touch roller 81U regardless of the outer diameter of the first separator roll 12U. This allows the first touch roller 81U to press the first separator 12a onto the take-up surface while a wrinkle is stretched.

Note, however, that it is preferable that one (1) first take-up assisting roller 83U having a concave shape is provided for one (1) first separator 12a and one (1) core u. As illustrated in FIG. 11, in a case where a plurality of sets of the first separator 12a and the core u are arranged side by side, the first take-up assisting rollers 83A through 83C each of which has a concave shape can be provided for the respective plurality of sets. Note that the first take-up assisting rollers 83A through 83C can include both a concave roller and a columnar roller that is not concave but is flat. Alternatively, in a case where one (1) first take-up assisting roller 83U conveys a plurality of first separators 12a, the first take-up assisting roller 83U can have a plurality of concave portions at positions corresponding to the respective plurality of first separators 12a (see FIG. 14D and FIGS. 15A and 15B). The same applies to the second take-up assisting roller 83L.

According to the present embodiment, the effect of inhibiting a wrinkle or misaligned winding is particularly suitable for a separator that is used in a battery. A separator (in particular, a separator coated with a layer) tends to have uneven film thickness distribution, and therefore a wrinkle or misaligned winding is more likely to occur when taking up the separator. Meanwhile, in a case where a wrinkle or misaligned winding is caused in a separator roll, the separator easily meanders when the separator is wound off in a battery production process. In a case where the separator meanders, defect is caused in lamination of a positive electrode film and a negative electrode film between which the separator is provided. As such, the separator roll is highly demanded to have less wrinkles and less misaligned winding, and it is therefore necessary to provide the take-up assisting roller. The present embodiment is applicable (i) to a single-layer separator that does not have a heat-resistant layer and (ii) also to a heat-resistant separator having a heat-resistant layer.

Figure 16A:
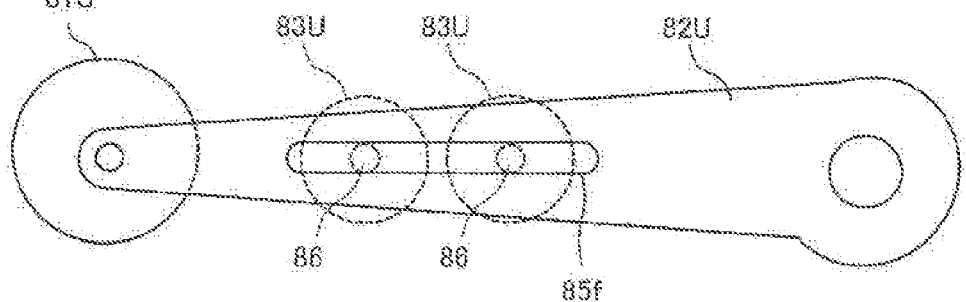
FIGS. 16A, 16B and 16C are views illustrating a modification example of a roller attaching section in an arm.
Figure 16B:
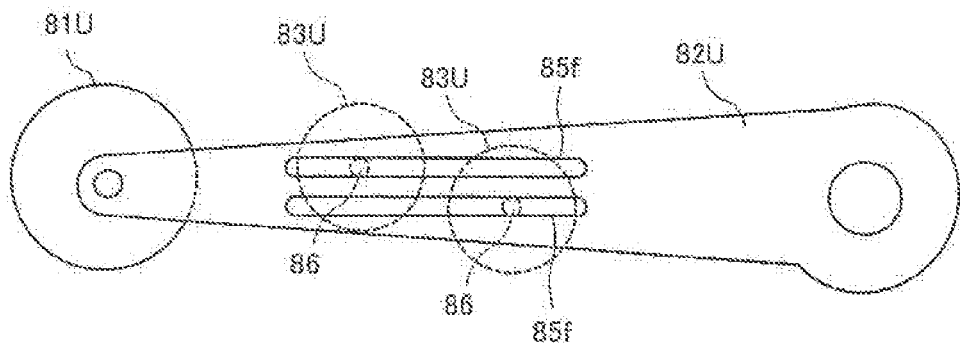
Figure 16C:
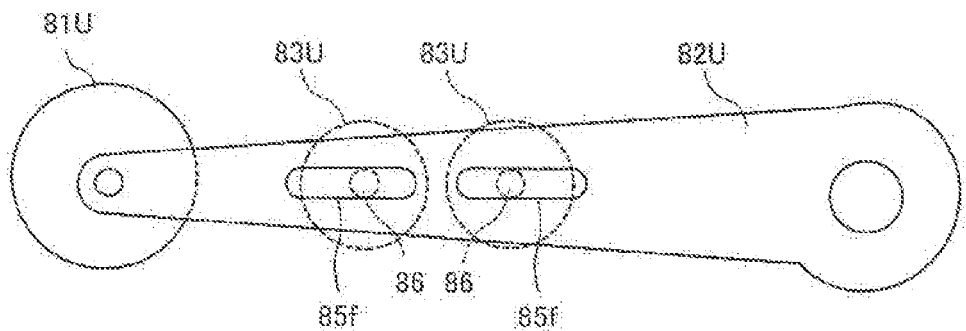

FIGS. 16A, 16B and 16C are views illustrating a modification example of a roller attaching section in an arm. Here, the first arm 82U is described as an example, and a similar description applies to the second arm 82L. FIGS. 16A, 16B and 16C illustrate both (i) a state in which the first take-up assisting roller 83U is provided at a certain position and (ii) a state in which the first take-up assisting roller 83U is provided at another position.

In an example illustrated in FIG. 16A, the first arm 82U has one (1) roller attaching section 85f which is an elongated hole, instead of the plurality of roller attaching sections. By fixing a shaft 86 of the first take-up assisting roller 83U within a range of the elongated hole of the roller attaching section 85f, a position of the first take-up assisting roller 83U is determined. That is, the user can select one of a plurality of distances between the first touch roller 81U and the first take-up assisting roller 83U. Note that the first take-up assisting roller 83U is rotatably supported by the shaft 86. By thus using the elongated hole, it is possible to finely adjust a position of the first take-up assisting roller 83U.

In an example illustrated in FIG. 16B, the first arm 82U has a plurality of roller attaching sections 85f each of which is an elongated hole. In this case, two roller attaching sections 85f are aligned in a direction perpendicular to a long-axis direction of the elongated hole. The first take-up assisting roller 83U is fixed at an arbitrary position in any of the plurality of roller attaching sections 85f.

In an example illustrated in FIG. 16C, the first arm 82U has a plurality of roller attaching sections 85f each of which is an elongated hole. In this case, two roller attaching sections 85f are aligned in a long-axis direction of the elongated hole. The first take-up assisting roller 83U is fixed at an arbitrary position in any of the plurality of roller attaching sections 85f.

Figure 17A:
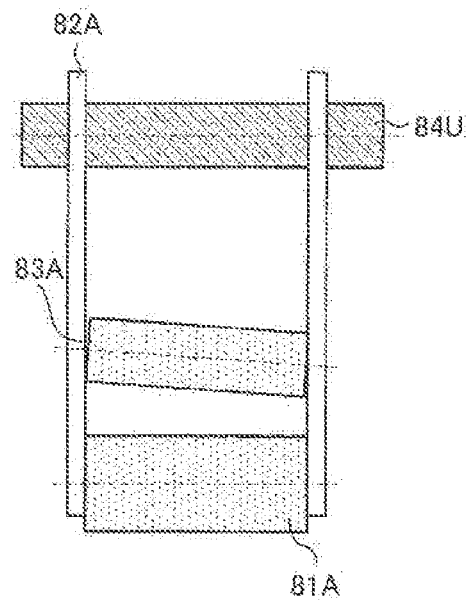
FIGS. 17A, 17B and 17C are views illustrating a modification example of a take-up assisting roller in a case where an arm has a roller attaching section that is an elongated hole.
Figure 17B:
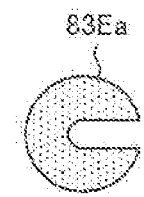
Figure 17C:
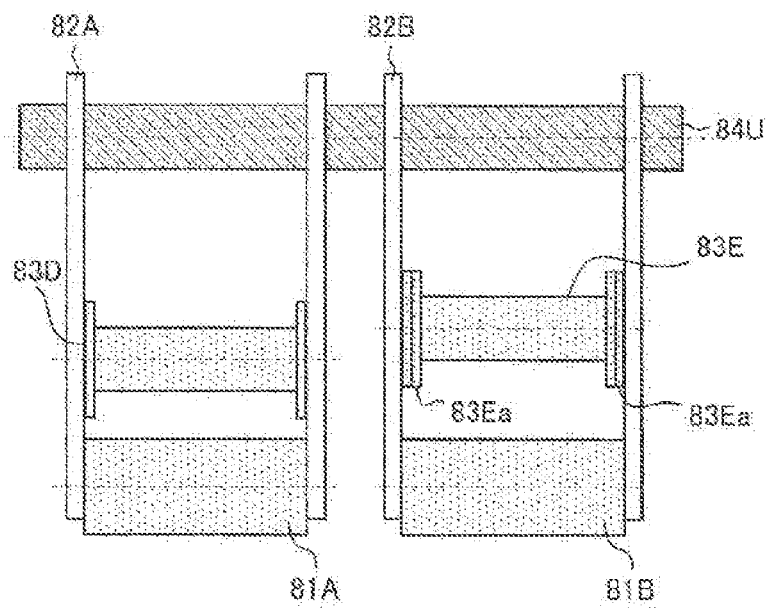

FIGS. 17A, 17B and 17C are views illustrating a modification example of a take-up assisting roller in a case where an arm has a roller attaching section that is an elongated hole. Each of FIGS. 17A and 17C is a plan view in which a part relating to the first arm, the first touch roller, and the first take-up assisting roller is viewed from above. In a case where the roller attaching section is an elongated hole, as illustrated in FIG. 17A, the first take-up assisting roller 83A may be fixed to the first arm 82A in a state in which an axis of the first take-up assisting roller 83A is inclined with respect to an axis of the first touch roller 81A or the like.

In order to prevent the axis of the first take-up assisting roller from being inclined, a first take-up assisting roller 83D can have flanges which are provided on both end parts of the first take-up assisting roller 83D and have a diameter larger than that of a roller part for guiding a separator (see FIG. 17C). The flanges are arranged along the first arm 82A, and it is therefore possible to prevent inclination of the first take-up assisting roller 83D. Note that the flanges can rotate together with the first take-up assisting roller 83D or can be fixed together with a shaft of the first take-up assisting roller 83D A spacer 83Ea illustrated in FIG. 17B can be provided (inserted) at an end part of the first take-up assisting roller 83E. The spacer 83Ea has a shape in which a circular plate is partially notched (at a position corresponding to the shaft). By providing one or more spacers 83Ea between the first take-up assisting roller 83E and the first arm 82B, it is possible to prevent the axis of the first take-up assisting roller 83E from being inclined. A diameter of the spacer 83Ea can be larger or smaller than a diameter of the first take-up assisting roller. By filling a gap between the first take-up assisting roller 83E and the first arm 82B with the spacer 83Ea, inclination of axis is prevented. Note that the spacer 83Ea can be fixed together with the shaft of the first take-up assisting roller 83E.

[Embodiment 4]

The following description will discuss still another embodiment of the present invention. Note that, for convenience of explanation, identical reference numerals are given to members which have respective functions identical with those described in the above embodiments, and descriptions of the respective members are omitted. According to the present embodiment, a take-up assisting roller is provided independently from an arm to which a touch roller is fixed. The same can apply to a second take-up assisting roller and the like, and therefore only the first take-up assisting roller and the like are described here.

Figure 12:
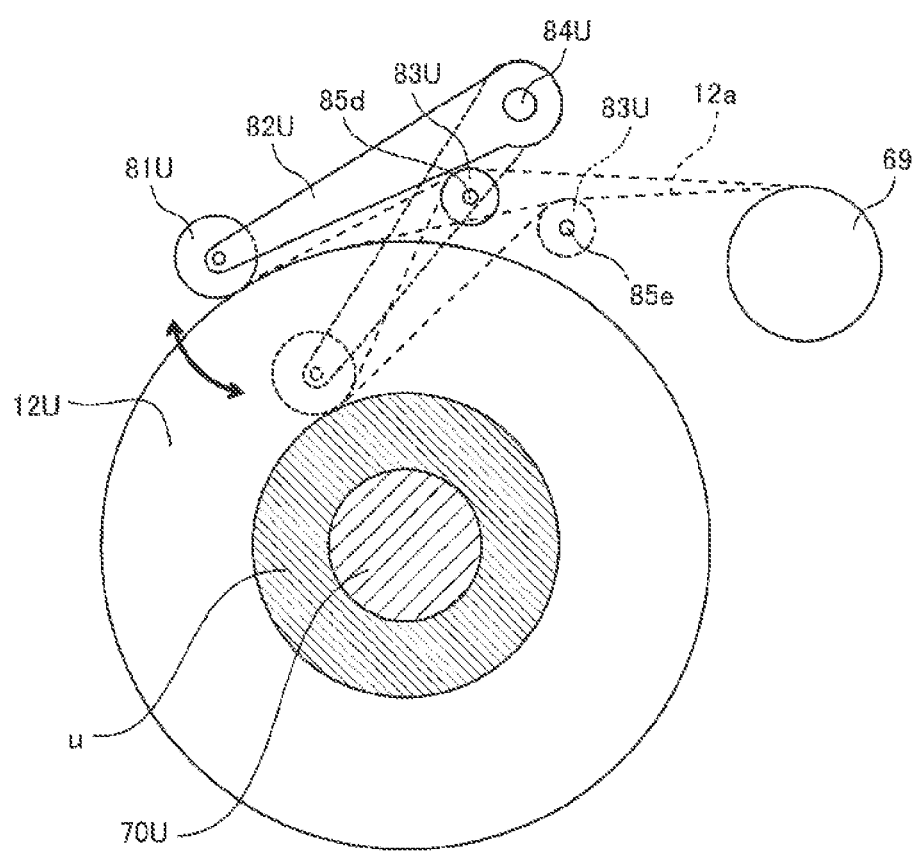
FIG. 12 is a view illustrating an arrangement of a take-up assisting roller in accordance with still another embodiment of the present invention.

FIG. 12 is a view illustrating an arrangement of a take-up assisting roller in accordance with the present embodiment. The slitting apparatus of the present embodiment has roller attaching sections 85d and 85e which are not provided in the first arm 82U. The roller attaching sections 85d and 85e are provided in, for example, a part that is fixed to a housing or a frame of the slitting apparatus. The user can select one of the roller attaching sections 85d and 85e as a position at which the first take-up assisting roller 83U is attached. The roller attaching sections 85d and 85e are fixed to the slitting apparatus (or the first take-up roller 70U), and therefore the position of the first take-up assisting roller 83U during production of a separator roll is fixed, regardless of an outer diameter of the first separator roll 12U. In such a configuration, it is possible to adjust a roller-to-roller distance to the first touch roller 81U.

In FIG. 12, positions of the first touch roller 81U and the first arm 82U at a beginning of winding the first separator 12a on the core u are indicated by dotted lines. Moreover, in FIG. 12, a position of the first take-up assisting roller 83U in a case where the first take-up assisting roller 83U is attached to the roller attaching section 85e is indicated by dotted lines. A conveying route of the first separator 12a varies depending on the position of the first take-up assisting roller 83U and the outer diameter of the first separator roll 12U, and FIG. 12 illustrates those variations. Here, in a case where the first take-up assisting roller 83U is attached to the roller attaching section 85e and the outer diameter of the first separator roll 12U is increased to a certain degree, the first separator 12a is to make contact with the first separator roll 12U before contacting with the first touch roller 81U. It is possible to employ a configuration in which an upper end of the first take-up assisting roller 83U (at which the first separator 12a passes through) is located upper than a lower end of the first touch roller 81U (at which the first separator 12a passes through) regardless of the outer diameter of the first separator roll 12U. Of course, as in FIG. 11, it is possible to provide a plurality of first touch rollers 81U and a plurality of first take-up assisting rollers 83U for one (1) first take-up roller 70U.

The first take-up assisting roller 83U which is immediately before the first touch roller 81U can be a concave roller.

[Embodiment 5]

The following description will discuss still another embodiment of the present invention. Note that, for convenience of explanation, identical reference numerals are given to members which have respective functions identical with those described in the above embodiments, and descriptions of the respective members are omitted.

Figure 13:
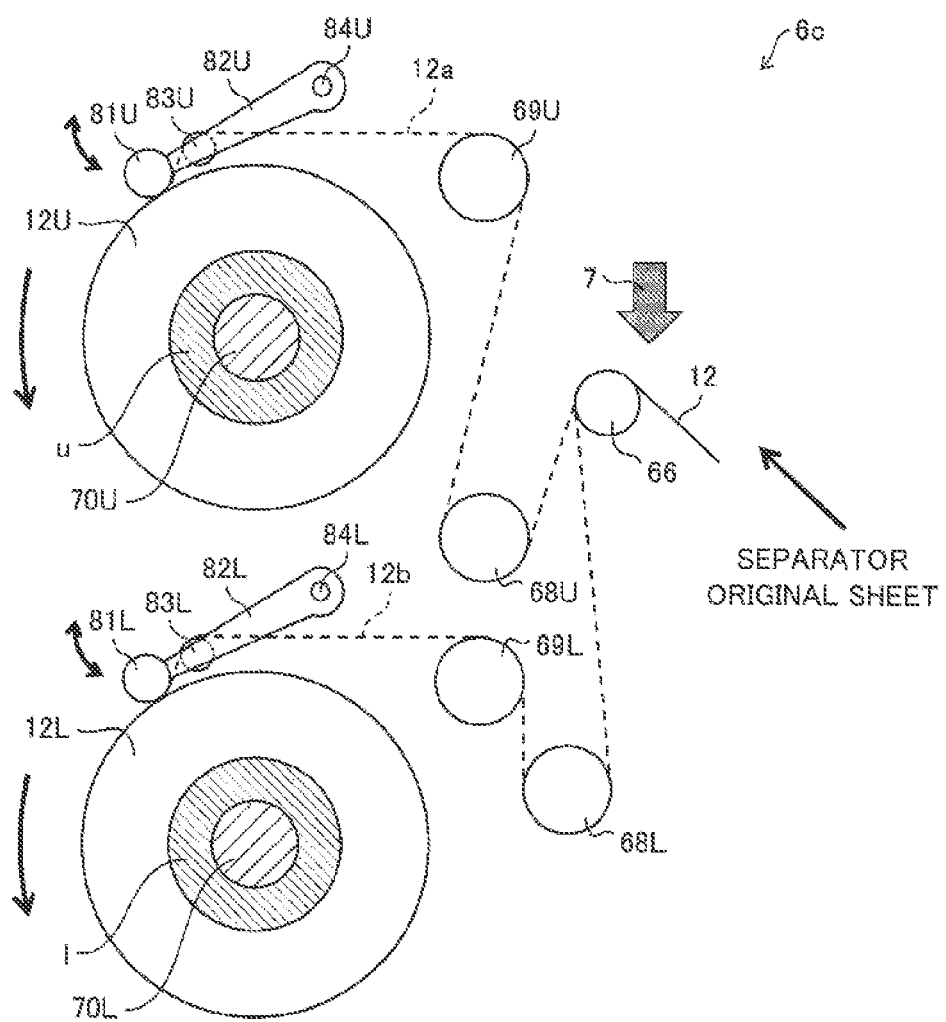
FIG. 13 is an enlarged view illustrating a part of a slitting apparatus in accordance with still another embodiment of the present invention.

FIG. 13 is an enlarged view illustrating a part of a slitting apparatus 6c in accordance with the present embodiment, as with FIG. 8. The slitting apparatus 6c includes a roller 66, a first direction changing roller 68U, a second direction changing roller 68L, a first assisting roller 69U, a second assisting roller 69L, a first touch roller 81U, a second touch roller 81L, a first arm 82U, a second arm 82L, a first take-up roller 70U, a second take-up roller 70L, and a plurality of cutting devices 7. A configuration relating to the first arm 82U, the second arm 82L, the first touch roller 81U, the second touch roller 81L, a first take-up assisting roller 83U, and a second take-up assisting roller 83L is identical with that in Embodiment 3. Each of the first take-up assisting roller 83U and the second take-up assisting roller 83L can be a concave roller.

A conveyed original sheet of the separator 12 is, for example, slit into a plurality of slit separators (first separator 12a and second separator 12b) by the plurality of cutting devices 7 (slitting section) on an upstream side of the roller 66. The first separator 12a and the second separator 12b are to be conveyed in different directions by the roller 66. The first separator 12a is conveyed to the first take-up assisting roller 83U via the first direction changing roller 68U and the first assisting roller 69U. The second separator 12b is conveyed to the second take-up assisting roller 83L via the second direction changing roller 68L and the second assisting roller 69L.

MODIFICATION EXAMPLE

In the above described embodiments, a material of the surface of each of the rollers can be an arbitrary one. For example, it is possible to employ a configuration in which a surface of the touch roller is made of resin and a surface of the take-up assisting roller which is immediately before the touch roller is made of metal.

In a case where the surface of the touch roller is made of resin, it is possible to ease collision between the separator roll and the touch roller caused by vibration in winding, and it is therefore possible to inhibit a wrinkle (in particular, a step-like wrinkle) caused by the collision. In a case where the surface of the take-up assisting roller is made of metal, it is possible to reduce abrasion of the take-up assisting roller, and it is therefore possible to inhibit a wrinkle or misaligned winding which is caused due to the abrasion. In particular, in a case where the take-up assisting roller makes contact with a heat-resistant layer which is of a separator and contains a filler, the abrasion becomes notable, and it is therefore preferable that the surface of the take-up assisting roller is made of metal.

[Main Points]

The slitting apparatus in accordance with an aspect of the present invention includes: a slitting section for slitting an original sheet of a battery separator in a lengthwise direction so as to divide the original sheet into at least a first separator and a second separator; a first take-up section and a second take-up section for taking up the first separator and the second separator, respectively, the first take-up section and the second take-up section being arranged in a positional relation of above and below; at least one direction changing roller for changing conveying directions of the first separator and the second separator toward the first take-up section and the second take-up section, respectively; and a first take-up assisting roller provided between a take-up position of the first separator to be wound and the direction changing roller so as to shorten a conveying distance between the take-up position and a roller immediately before the take-up position, the first take-up assisting roller being a concave roller.

The first take-up section and the second take-up section are arranged in the positional relation of above and below, and therefore the conveying distance of the separator from the direction changing roller to one of the take-up positions tends to become long. In a case where the conveying distance from the roller immediately before the take-up position to the take-up position is long, a wrinkle or misaligned winding is more likely to be caused in the separator to be wound.

According to the configuration, the first take-up assisting roller is provided between the direction changing roller and the take-up position of the first separator so as to shorten the conveying distance between the take-up position and a roller immediately before the take-up position. Moreover, by the first take-up assisting roller which is a concave roller, it is possible to stretch a wrinkle of the first separator. This makes it possible to inhibit a wrinkle or misaligned winding caused in the first separator. The "take-up position" means a position at which a separator which has been conveyed to be wound makes contact with a take-up surface of a separator roll which is being wound. Note that the "conveying distance" means a distance along a conveying route in a part in which a conveyed separator is not supported by a roller or a roll (i.e., the separator is in a free state). Moreover, the "positional relation of above and below" means a positional relation of being not horizontally aligned (i.e., being positioned above and below).

It is possible that the direction changing roller is provided at a position which is nearer to a take-up position of the second separator than to the take-up position of the first separator.

According to the configuration, the direction changing roller is provided at the position which is nearer to the take-up position of the second separator than to the take-up position of the first separator. From this, it is possible to omit to provide a take-up assisting roller between the direction changing roller and the take-up position of the second separator.

It is possible to employ a configuration in which the slitting apparatus further includes a second take-up assisting roller provided between a take-up position of the second separator to be wound and the direction changing roller so as to shorten a conveying distance between the take-up position of the second separator and a roller immediately before the take-up position of the second separator, the second take-up assisting roller being a concave roller.

According to the configuration, the first take-up assisting roller and the second take-up assisting roller are provided, and it is therefore possible to enhance a degree of freedom relating to arrangement of the direction changing roller.

It is possible that the take-up assisting roller is provided such that the conveying distance between the take-up position of the first separator and a roller immediately before the take-up position of the first separator becomes identical with a conveying distance between a take-up position of the second separator and a roller immediately before the take-up position of the second separator.

According to the configuration, it is possible to prevent a difference in wound state from occurring between a roll of the first separator and a roll of the second separator.

The method for producing a separator roll in accordance with an aspect of the present invention includes the steps of: (a) slitting an original sheet of a battery separator in a lengthwise direction so as to divide the original sheet into at least a first separator and a second separator; (b) changing conveying directions of the first separator and the second separator by at least one direction changing roller toward a first take-up section and a second take-up section, respectively; (c) taking up the first separator and the second separator by the first take-up section and the second take-up section, respectively, the first take-up section and the second take-up section being arranged in a positional relation of above and below; and (d) conveying the first separator via a first take-up assisting roller which is provided between a take-up position of the first separator to be wound and the direction changing roller so as to shorten a conveying distance between the take-up position and a roller immediately before the take-up position, the first take-up assisting roller being a concave roller.

It is possible that the direction changing roller is provided at a position which is nearer to a take-up position of the second separator than to the take-up position of the first separator.

It is possible that, in the step (d), the second separator is conveyed via a second take-up assisting roller which is provided between a take-up position of the second separator to be wound and the direction changing roller so as to shorten a conveying distance between the take-up position of the second separator and a roller immediately before the take-up position of the second separator, the second take-up assisting roller being a concave roller.

It is possible that the take-up assisting roller is provided such that the conveying distance between the take-up position of the first separator and a roller immediately before the take-up position of the first separator becomes identical with a conveying distance between a take-up position of the second separator and a roller immediately before the take-up position of the second separator.

The slitting apparatus in accordance with an aspect of the present invention includes: a slitting section for slitting an original sheet of a battery separator in a lengthwise direction so as to divide the original sheet into a plurality of separators; a take-up section for winding one of the plurality of separators on a core; a touch roller whose position is changed in accordance with a change in outer diameter of a separator roll so as to press the one of the plurality of separators onto a take-up surface of the separator roll which has been formed on the core; and a take-up assisting roller for conveying the one of the plurality of separators immediately before the touch roller, the take-up assisting roller being a concave roller.

According to the configuration, it is possible to stretch a wrinkle of the separator on the take-up assisting roller immediately before the touch roller. This makes it possible to take up the separator in a state in which a wrinkle is being stretched. It is therefore possible to inhibit a wrinkle caused in a separator roll.

It is possible to employ a configuration in which the take-up section includes one (1) rotation shaft for holding a plurality of cores on which the respective plurality of separators are wound; the slitting apparatus includes, for the one (1) rotation shaft, (i) a plurality of touch rollers each of which is the touch roller and (ii) a plurality of take-up assisting rollers each of which is the take-up assisting roller, positions of the plurality of touch rollers being separately changed in accordance with changes in outer diameter of a plurality of separator rolls each of which is the separator roll, and positions of the plurality of take-up assisting rollers being separately changed in accordance with changes in outer diameter of the plurality of separator rolls; and each of the plurality of take-up assisting rollers is a concave roller.

According to the configuration, the plurality of touch rollers whose positions are separately changed can appropriately press the plurality of separators onto the respective take-up surfaces of the plurality of separator rolls, even in a case where a thickness of the original sheet of separator is not uniform. Moreover, wrinkles in the plurality of separators can be stretched by the plurality of take-up assisting rollers each of which is the concave roller.

It is possible to employ a configuration in which the take-up assisting roller conveys the plurality of separators which are arranged side by side; and the take-up assisting roller has a plurality of concave portions at positions corresponding to the respective plurality of separators.

According to the configuration, even in a case where a plurality of separators arranged side by side are carried by the one (1) take-up assisting roller, it is possible to stretch wrinkles in the plurality of separators by the plurality of concave portions provided in the one (1) take-up assisting roller.

It is possible to employ a configuration in which the take-up assisting roller has (i) a plurality of concave roller parts which correspond to the respective plurality of separators and (ii) a spacer which is provided between the plurality of concave roller parts and is exchangeable.

It is possible to employ a configuration in which a position of the take-up assisting roller is changed in accordance with positional change of the touch roller.

According to the configuration, it is possible to keep a short roller-to-roller distance between the take-up assisting roller and the touch roller, regardless of the outer diameter of the separator roll. Therefore, the touch roller can press the separator onto the take-up surface in a state where a wrinkle is being stretched.

It is possible to employ a configuration in which a distance between the touch roller and the take-up assisting roller is constant, regardless of a change in outer diameter of the separator roll.

It is possible to employ a configuration in which the slitting apparatus further includes an arm which is provided so as to swing or is provided so that a position of the arm is changeable, the touch roller and the take-up assisting roller being fixed to the arm.

It is possible to employ a configuration in which a surface of the touch roller is made of resin; and a surface of the take-up assisting roller is made of metal.

According to the configuration, it is possible to ease collision between the touch roller and the separator roll, and it is therefore possible to inhibit a wrinkle caused by the collision.

The method for producing a separator roll in accordance with an aspect of the present invention includes the steps of: (A) slitting an original sheet of a battery separator in a lengthwise direction so as to divide the original sheet into a plurality of separators; (B) winding one of the plurality of separators on a core; (C) pressing, by a touch roller, the one of the plurality of separators onto a take-up surface of a separator roll which has been formed on the core, a position of the touch roller being changed in accordance with a change in outer diameter of the separator roll; and (D) conveying, by a take-up assisting roller, the one of the plurality of separators immediately before the touch roller, the take-up assisting roller being a concave roller.

It is possible to employ a configuration in which, in the step (B), the plurality of separators are wound on a plurality of cores which are held on one (1) rotation shaft, each of the plurality of cores being the core; in the step (C), the plurality of separators are respectively pressed by a plurality of touch rollers onto take-up surfaces of a plurality of separator rolls which have been formed on the respective plurality of cores, each of the plurality of touch rollers being the touch roller, each of the plurality of separator rolls being the separator roll, and the plurality of touch rollers being provided for the one (1) rotation shaft and positions of the plurality of touch rollers being separately changed in accordance with changes in outer diameter of the plurality of separator rolls; and in the step (D), the plurality of separators are conveyed by a plurality of take-up assisting rollers whose positions are separately changed in accordance with positional changes of the respective plurality of touch rollers, each of the plurality of take-up assisting rollers being a concave roller.

It is possible to employ a configuration in which the take-up assisting roller conveys the plurality of separators which are arranged side by side; and the take-up assisting roller has a plurality of concave portions at positions corresponding to the respective plurality of separators.

It is possible to employ a configuration in which the take-up assisting roller has (i) a plurality of concave roller parts which correspond to the respective plurality of separators and (ii) a spacer which is provided between the plurality of concave roller parts and is exchangeable.

It is possible to employ a configuration in which a position of the take-up assisting roller is changed in accordance with positional change of the touch roller.

It is possible to employ a configuration in which a distance between the touch roller and the take-up assisting roller is constant, regardless of a change in outer diameter of the separator roll.

It is possible to employ a configuration in which the touch roller and the take-up assisting roller are fixed to an arm which is provided so as to swing or is provided so that a position of the arm is changeable.

It is possible to employ a configuration in which a surface of the touch roller is made of resin; and a surface of the take-up assisting roller is made of metal.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention can be used in a slitting apparatus, a method for producing a separator roll, and the like.

REFERENCE SIGNS LIST

1: Lithium-ion secondary battery
4: Heat-resistant layer
5: Porous film
6, 6a, 6b, 6c: Slitting apparatus
7: Cutting device (slitting section)
12, 12a, 12b: Separator, first and second separators
12U, 12L: First and second separator rolls
68, 68U, 68L: First and second direction changing rollers
69, 69U, 69L, 69a, 69b: Assisting roller (take-up assisting roller), first and second assisting rollers (first and second take-up assisting rollers)
70U, 70L: First and second take-up rollers (first and second take-up sections, rotation shafts)
81U, 81L: First and second touch rollers
82U, 82L: First and second arms
83A through 83E, 83U, 83L: First and second take-up assisting rollers
85a through 85f: Roller attaching section
91: Concave roller section
92a, 92b: Flat roller section
1, u: Core

What is claimed is:

1. A slitting apparatus comprising:
   a slitting section for slitting an original sheet of a battery separator in a lengthwise direction so as to divide the original sheet into at least a first separator and a second separator;
   a first take-up section and a second take-up section for taking up the first separator and the second separator, respectively, the first take-up section and the second take-up section being arranged in a positional relation of above and below;
   at least one direction changing roller for changing conveying directions of the first separator and the second separator toward the first take-up section and the second take-up section, respectively; and
   a first take-up assisting roller provided between a take-up position of the first separator to be wound and the direction changing roller, a conveying distance between the first take-up assisting roller and the take-up position of the first separator being shorter than a conveying distance between the direction changing roller and the take-up position of the first separator if the first take-up assisting roller was not provided, the first take-up assisting roller being a concave roller.

2. The slitting apparatus as set forth in claim 1, wherein:
   the direction changing roller is provided at a position which is nearer to a take-up position of the second separator than to the take-up position of the first separator.

3. The slitting apparatus as set forth in claim 1, further comprising:
   a second take-up assisting roller provided between a take-up position of the second separator to be wound and the direction changing roller, a conveying distance between the second take-up assisting roller and the take-up position of the second separator being shorter than a conveying distance between the direction changing roller and the take-up position of the second separator if the second take-up assisting roller was not provided, the second take-up assisting roller being a concave roller.

4. The slitting apparatus as set forth in claim 3, wherein:
   the take-up assisting roller is provided such that conveying distance between the first take-up assisting roller and the take-up position of the first separator is identical to the conveying distance between the second take-up assisting roller and the take-up position of the second separator.

5. The slitting apparatus as set forth in claim 1, wherein:
the take-up assisting roller is provided such that the conveying distance between the first take-up assisting roller and the take-up position of the first separator is identical to the conveying distance between the direction changing roller and the take-up position of the second separator.

6. The slitting apparatus as set forth in claim 1, wherein:
the first take-up assisting roller is immediately before the take-up position.

7. The slitting apparatus as set forth in claim 1, wherein:
the first take-up assisting roller has an outer diameter that gradually becomes larger in a transverse direction or becomes larger step-by-step in a transverse direction from a center of the at least one of the plurality of separators toward opposite edges of the at least one of the plurality of separators.

8. A method for producing a separator roll, said method comprising the steps of:
(a) slitting an original sheet of a battery separator in a lengthwise direction so as to divide the original sheet into at least a first separator and a second separator;
(b) changing conveying directions of the first separator and the second separator by at least one direction changing roller toward a first take-up section and a second take-up section, respectively;
(c) taking up the first separator and the second separator by the first take-up section and the second take-up section, respectively, the first take-up section and the second take-up section being arranged in a positional relation of above and below; and
(d) conveying the first separator via a first take-up assisting roller which is provided between a take-up position of the first separator to be wound and the direction changing roller, a conveying distance between the first take-up assisting roller and the take-up position of the first separator being shorter than a conveying distance between the direction changing roller and the take-up position of the first separator if the first take-up assisting roller was not provided, the first take-up assisting roller being a concave roller.

9. The method as set forth in claim 8, wherein:
the direction changing roller is provided at a position which is nearer to a take-up position of the second separator than to the take-up position of the first separator.

10. The method as set forth in claim 8, wherein:
in the step (d), the second separator is conveyed via a second take-up assisting roller which is provided between a take-up position of the second separator to be wound and the direction changing roller, a conveying distance between the second take-up assisting roller and the take-up position of the second separator being shorter than a conveying distance between the direction changing roller and the take-up position of the second separator if the second take-up assisting roller was not provided, the second take-up assisting roller being a concave roller.

11. The method as set forth in claim 10, wherein:
the take-up assisting roller is provided such that conveying distance between the first take-up assisting roller and the take-up position of the first separator is identical to the conveying distance between the second take-up assisting roller and the take-up position of the second separator.

12. The method as set forth in claim 8, wherein:
the take-up assisting roller is provided such that the conveying distance between the first take-up assisting roller and the take-up position of the first separator is identical to the conveying distance between the direction changing roller and the take-up position of the second separator.

13. The method as set forth in claim 8, wherein:
the first take-up assisting roller is immediately before the take-up position.

14. The method as set forth in claim 8, wherein:
the first take-up assisting roller has an outer diameter that gradually becomes larger in a transverse direction or becomes larger step-by-step in a transverse direction from a center of the at least one of the plurality of separators toward opposite edges of the at least one of the plurality of separators.

* * * * *